bibliographic data page — omitted per instructions
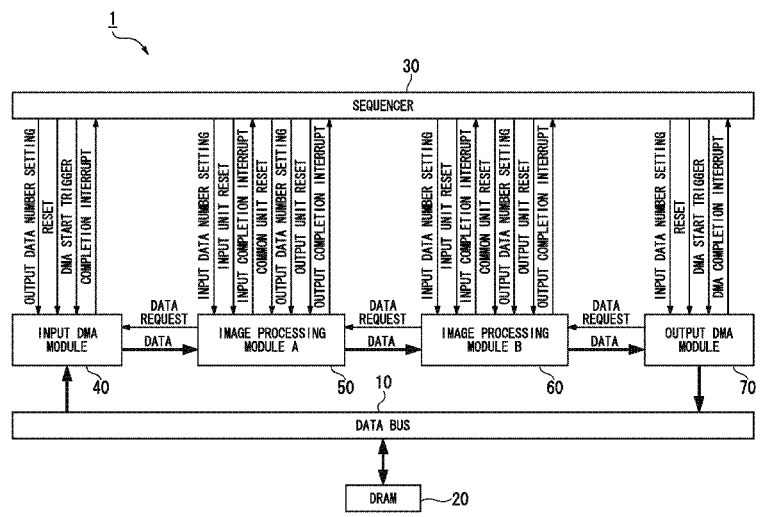

(56) References Cited

U.S. PATENT DOCUMENTS

| | | |
|---|---|---|
| 2005/0237803 A1* | 10/2005 | Takase et al. ............ 365/185.11 |
| 2006/0132874 A1 | 6/2006 | Ishikawa |
| 2007/0143506 A1 | 6/2007 | Raju et al. |
| 2010/0199071 A1 | 8/2010 | Nakazono et al. |
| 2011/0161577 A1 | 6/2011 | Johnson |
| 2012/0110222 A1* | 5/2012 | Dang et al. ...................... 710/52 |

FOREIGN PATENT DOCUMENTS

| | | |
|---|---|---|
| JP | 2003-219185 A | 7/2003 |
| JP | 2004-206487 A | 7/2004 |
| JP | 2004-220432 A | 8/2004 |
| JP | 2005-102168 A | 4/2005 |
| JP | 2010-176606 A | 8/2010 |

OTHER PUBLICATIONS

U.S. Office Action dated Jan. 31, 2014, issued in related U.S. Appl. No. 13/285,499, (22 pages).

Office Action dated Jun. 3, 2014, issued in corresponding Japanese Patent Application No. 2010-245479, with English Translation (4 pages).

Office Action dated Jun. 24, 2014, issued in corresponding Japanese Patent Application No. 2010-245478, with English Translation (5 pages).

Notice of Allowance and Fee(s) Due dated Jul. 24, 2014, issued in corresponding U.S. Appl. No. 13/285,499 (13 pages).

* cited by examiner

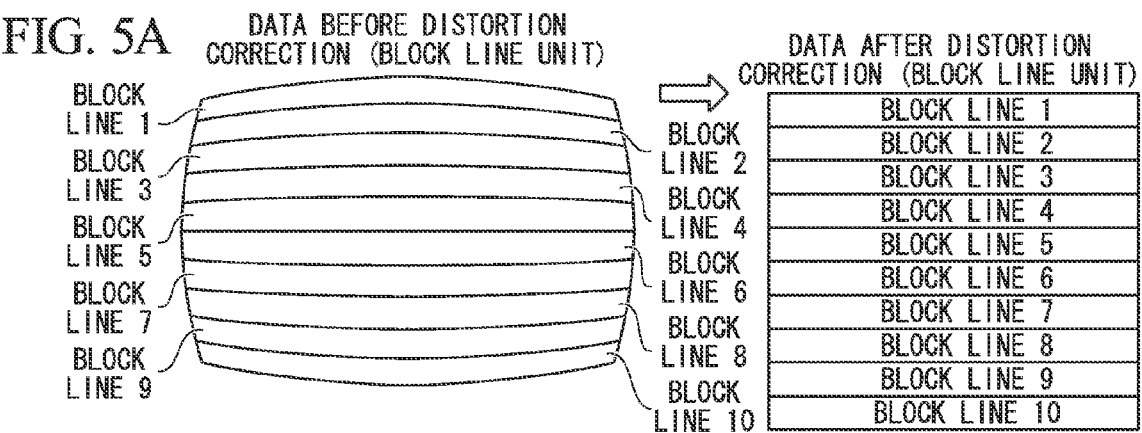
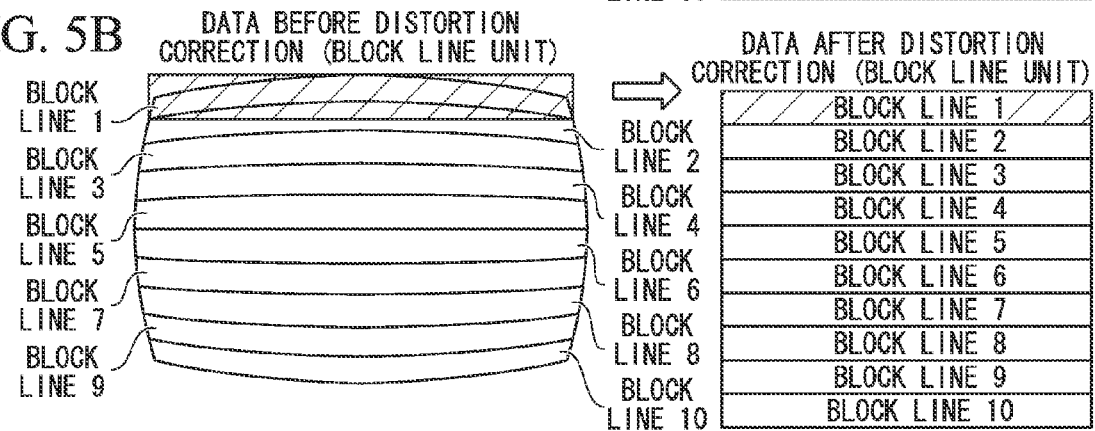
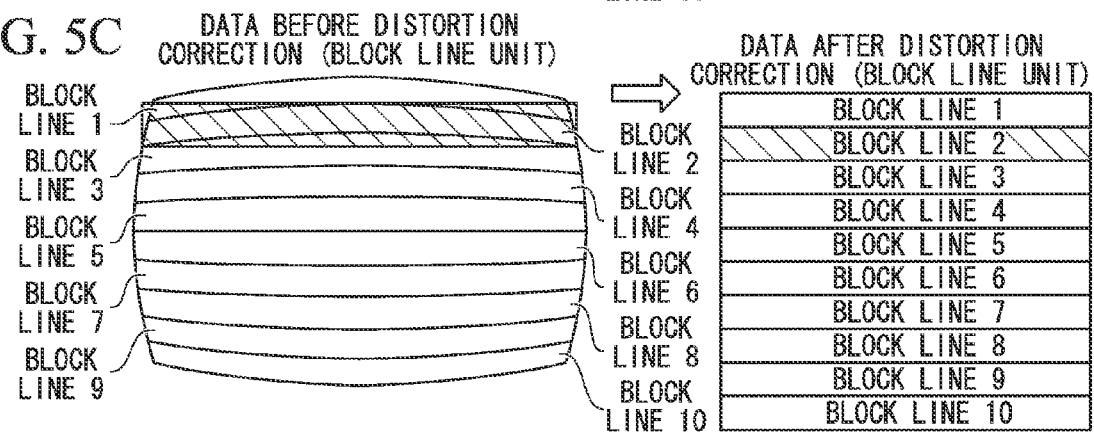
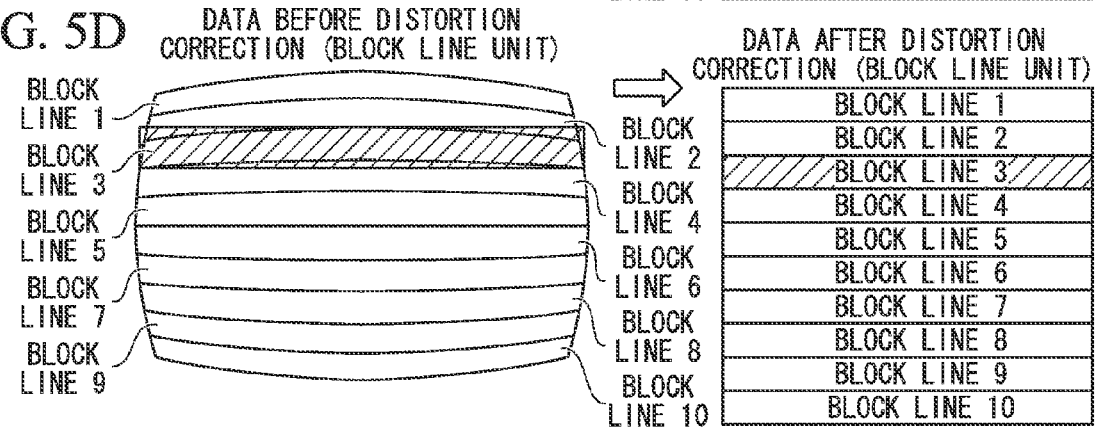

FIG. 8A

| AREA 1 | AREA 2 | AREA 3 | AREA 4 | AREA 5 | AREA 6 | AREA 7 | AREA 8 | AREA 9 | AREA 10 | AREA 11 | AREA 12 | AREA 13 | AREA 14 | AREA 15 | AREA 16 |
|---|---|---|---|---|---|---|---|---|---|---|---|---|---|---|---|
| IBL1-1 | IBL1-2 | IBL1-3 | IBL1-4 | IBL1-5 | IBL1-6 | IBL1-7 | IBL1-8 | IBL1-9 | IBL1-10 | IBL1-11 | IBL1-12 | IBL1-13 | IBL1-14 | IBL1-15 | IBL1-16 |

FIG. 8B

| AREA 1 | AREA 2 | AREA 3 | AREA 4 | AREA 5 | AREA 6 | AREA 7 | AREA 8 | AREA 9 | AREA 10 | AREA 11 | AREA 12 | AREA 13 | AREA 14 | AREA 15 | AREA 16 |
|---|---|---|---|---|---|---|---|---|---|---|---|---|---|---|---|
| IBL1-17 | IBL1-18 | IBL1-19 | IBL1-20 | IBL2-1 | IBL2-2 | IBL2-3 | IBL2-4 | IBL2-5 | IBL2-6 | IBL2-7 | IBL2-8 | IBL2-9 | IBL2-10 | IBL2-11 | IBL2-12 |

FIG. 8C

| AREA 1 | AREA 2 | AREA 3 | AREA 4 | AREA 5 | AREA 6 | AREA 7 | AREA 8 | AREA 9 | AREA 10 | AREA 11 | AREA 12 | AREA 13 | AREA 14 | AREA 15 | AREA 16 |
|---|---|---|---|---|---|---|---|---|---|---|---|---|---|---|---|
| IBL2-13 | IBL2-14 | IBL2-15 | IBL2-16 | IBL2-17 | IBL2-18 | IBL2-19 | IBL2-20 | IBL3-1 | IBL3-2 | IBL3-3 | IBL3-4 | IBL3-5 | IBL3-6 | IBL3-7 | IBL3-8 |

FIG. 8D

| AREA 1 | AREA 2 | AREA 3 | AREA 4 | AREA 5 | AREA 6 | AREA 7 | AREA 8 | AREA 9 | AREA 10 | AREA 11 | AREA 12 | AREA 13 | AREA 14 | AREA 15 | AREA 16 |
|---|---|---|---|---|---|---|---|---|---|---|---|---|---|---|---|
| IBL3-9 | IBL3-10 | IBL3-11 | IBL3-12 | IBL3-13 | IBL3-14 | IBL3-15 | IBL3-16 | IBL3-17 | IBL3-18 | IBL3-19 | IBL3-20 | | | | |

DATA PROCESSING APPARATUS AND IMAGE PROCESSING APPARATUS

BACKGROUND OF THE INVENTION

1. Field of the Invention

The present invention relates to a data processing apparatus and an image processing apparatus.

Priority is claimed on Japanese Patent Application No. 2010-245478, filed Nov. 1, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In an imaging apparatus such as a still-image camera, a moving-image camera, a medical endoscope camera, or an industrial endoscope camera, an image processing apparatus capable of processing image data of a large number of pixels in a short time is necessary with the improvement of the number of pixels of the imaging apparatus and the improvement of a continuous shooting speed. As technology for increasing the speed of processing the above-described image data, technology using a pipeline process in image processing is known as shown in FIG. 14A (see Japanese Unexamined Patent Application, First Publication No. 2000-312327). FIGS. 14A, 14B, and 14C are diagrams illustrating schematic configurations and operations of an image processing apparatus that performs a pipeline process in accordance with the related art. According to the technology disclosed in Japanese Unexamined Patent Application, First Publication No. 2000-312327, a still-image of one frame is divided into blocks having a plurality of overlap parts (or overlap-width parts). Processing in which a plurality of image processes are directly connected as in "Frame Memory→Image Process 1→Image Process 2→ . . . →Image Process n→Joint Photographic Experts Group (JPEG) processing→Frame Memory" for each divided block is performed. However, while a flow of image data to be processed within each divided block is continuous, a flow of data between different blocks is not continuous (see FIG. 14B).

Thus, a sequencer, which controls the entire pipeline process, resets a range of image data to be processed in each processing module (processing unit) constituting a pipeline, or the like before a pipeline process of each block is started (see FIG. 14C). When an image processing operation is controlled for each series of pipeline processes, a period of time loss in which any one of processing modules constituting the pipeline does not operate occurs during processing of blocks. The loss time in which the processing module does not operate affects a processing time of a still image of one frame.

As technology for processing image data at a higher speed, as shown in FIG. 15, technology for outputting an interrupt signal indicating that processing by a processing module is completed to a sequencer for each processing module constituting a pipeline is disclosed (see Japanese Unexamined Patent Application, First Publication No. 2010-176606). FIG. 15 is a block diagram illustrating a schematic configuration of an image processing apparatus that performs the pipeline process at a high speed in accordance with the related art. FIGS. 16A and 16B are diagrams illustrating an operation of the image processing apparatus that performs the pipeline process at the high speed in accordance with the related art. In the technology disclosed in Japanese Unexamined Patent Application, First Publication No. 2010-176606, the sequencer individually changes settings of the processing module every time the interrupt signal is input from the processing module. Thereby, the sequencer changes the settings of the processing module every time a process of each processing module is completed, not every time processing of a divided block is started. In the technology of Japanese Unexamined Patent Application, First Publication No. 2010-176606, the time loss in processing between blocks is reduced and the speed of processing a still image of one frame is increased when the sequencer changes the settings of each processing module for every processing module as described above (see FIG. 16A).

However, if attention is focused on one processing module of processing modules constituting the pipeline (for example, if attention is focused on a YC processing module as shown in FIG. 16B), a delay time from an input to the processing module to an output from the processing module occurs. A total time including the delay time and a time taken to change settings of the processing, module, that is, a time from when an output corresponding to a first block is completed to when an output corresponding to the next block starts, becomes a loss time in the speed-up of image data processing.

The loss time becomes a more noticeable problem in a processing module in which a delay time from an input to the processing module to an output from the processing module is long, for example, such as a processing module that performs a filtering operation having a large number of taps or a processing module that corrects the distortion aberration of a lens of an imaging apparatus.

SUMMARY

The present invention provides a data processing apparatus and an image processing apparatus capable of reducing a loss time of each pipeline process including data processing having a long delay time from an input to a processing module to an output from the processing module.

A data processing apparatus may include: a buffer unit that stores data; a data write control unit that writes input data to the buffer unit; a data read control unit that reads the data stored in the buffer unit, the data read control unit outputting output data generated based on the read data; and a buffer area determination unit that determines a storage area within the buffer unit to which the data write control unit writes the data and a storage area within the buffer unit from which the data read control unit reads the data. The data write control unit may write the input data to the storage area determined by the buffer area determination unit, and output a data write completion signal indicating that the writing of the data is completed when the writing of the input data is completed. The data read control unit may read the data from the storage area determined by the buffer area determination unit, and output a data read completion signal indicating that the reading of the data is completed when the output of the output data generated based on the read data is completed.

The data write control unit may writes the input data to a writable area within the buffer unit determined by the buffer area determination unit, and determine that the writing of the data is completed when writing of a preset number of input data to the buffer unit is completed. The data read control unit may read the data from a readable area within the buffer unit determined by the buffer area determination unit, complete reading of a preset number of output data from the buffer unit, and determine that the reading of the data is completed when the output of the output data generated based on the read data is completed. The buffer area determination unit may change the writable area and the readable area within the buffer unit according to a write state of the input data by the data write control unit and a read state of the data by the data read control unit.

The buffer area determination unit may determine the storage area within the buffer unit to which the data is written by the data write control unit as the readable area in which valid data is stored and from which the stored data is readable. The buffer area determination unit may determine the storage area within the buffer unit from which the data is read by the data read control unit as the writable area having an empty area and to which the input data is writable.

The data read control unit may include a filtering unit that generates output data filtered based on the read data. A storage capacity of the storage area within the buffer unit may be determined based on the necessary number of data when the filtering unit performs a filtering operation.

The storage capacity may be a capacity capable of storing the input data of which the number is twice the necessary number of data when the filtering unit performs the filtering operation.

An image processing apparatus may include a data processing apparatus. The data processing apparatus may include: a buffer unit that stores data; a data write control unit that writes input data to the buffer unit; a data read control unit that reads the data stored in the buffer unit, the data read control unit outputting output data generated based on the read data; and a buffer area determination unit that determines a storage area within the buffer unit to which the data write control unit writes the data and a storage area within the buffer unit from which the data read control unit reads the data. The data write control unit may write the input data to the storage area determined by the buffer area determination, unit, and output a data write completion signal indicating that the writing of the data is completed when the writing of the input data is completed. The data read control unit may read the data from the storage area determined by the buffer area determination unit, and output a data read completion signal indicating that the reading of the data is completed when the output of the output data generated based on the read data is completed. The data write control unit may perform settings related to writing of image data after the data write completion signal is output. The data read control unit may perform settings related to reading of the image data after the data read completion signal is output.

According to the present invention, it is possible to reduce a loss time of each pipeline process including data processing having a long delay time from an input to a processing module to an output from the processing module.

BRIEF DESCRIPTION OF THE DRAWINGS

The above features and advantages of the present invention will be more apparent from the following description of certain preferred embodiments taken in conjunction with the accompanying drawings, in which:

FIGS. 5A, 5B, 5C, and 5D are diagrams illustrating examples of the distortion correction processing method in the image processing module in accordance with the first preferred embodiment of the present invention;

FIGS. 8A, 8B, 8C, and 8D are diagrams illustrating an operation example in which data is written to the data buffer included in the image processing module in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
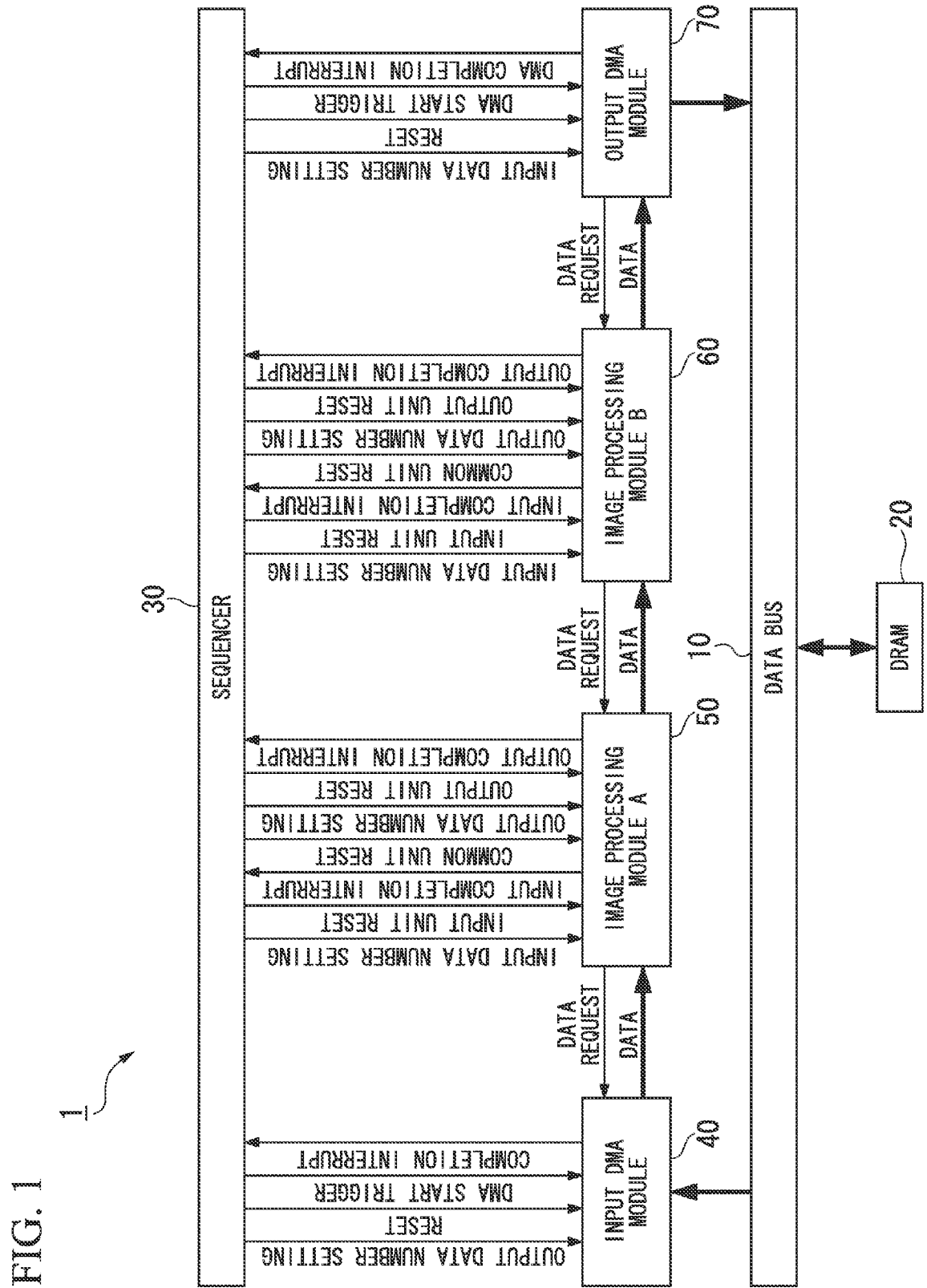
FIG. 1 is a block diagram illustrating a schematic configuration of an image processing apparatus in accordance with a first preferred embodiment of the present invention.

FIG. 1 is a block diagram illustrating a schematic configuration of an image processing apparatus in accordance with a first preferred embodiment of the present invention. The image processing apparatus 1 shown in FIG. 1 includes a direct memory access (DMA) bus 10, a dynamic random access memory (DRAM) 20, a sequencer 30, an input DMA module 40, an image processing module-A 50, an image processing module-B 60, and an output DMA module 70. The image processing apparatus 1 of this embodiment is included, for example, in an imaging apparatus such as a still-image camera.

Figure 14A:
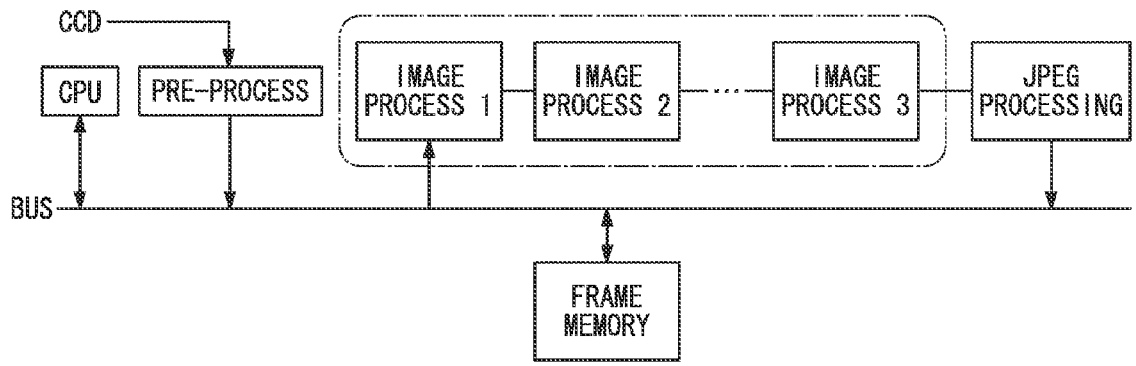
FIGS. 14A, 14B, and 14C are diagrams illustrating schematic configurations and operations of an image processing apparatus that performs a pipeline process in accordance with the related art.
Figure 14B:
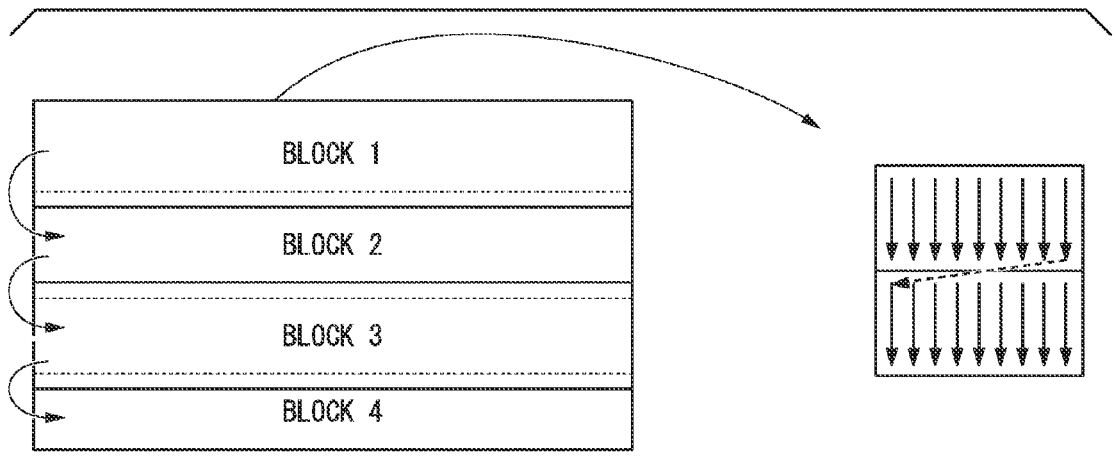
Figure 14C:
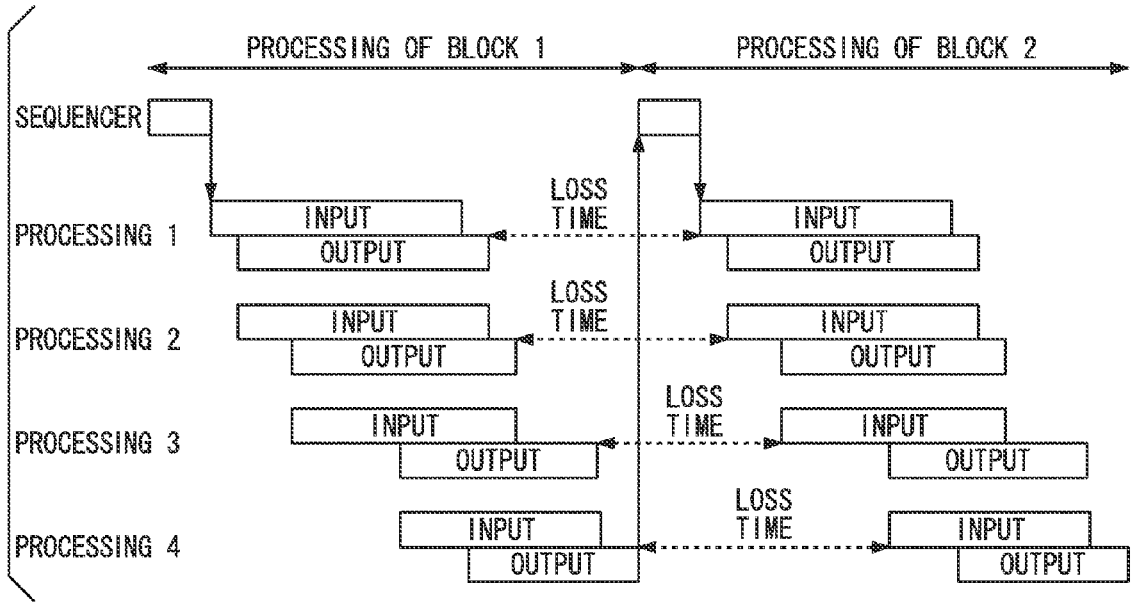
Figure 15:
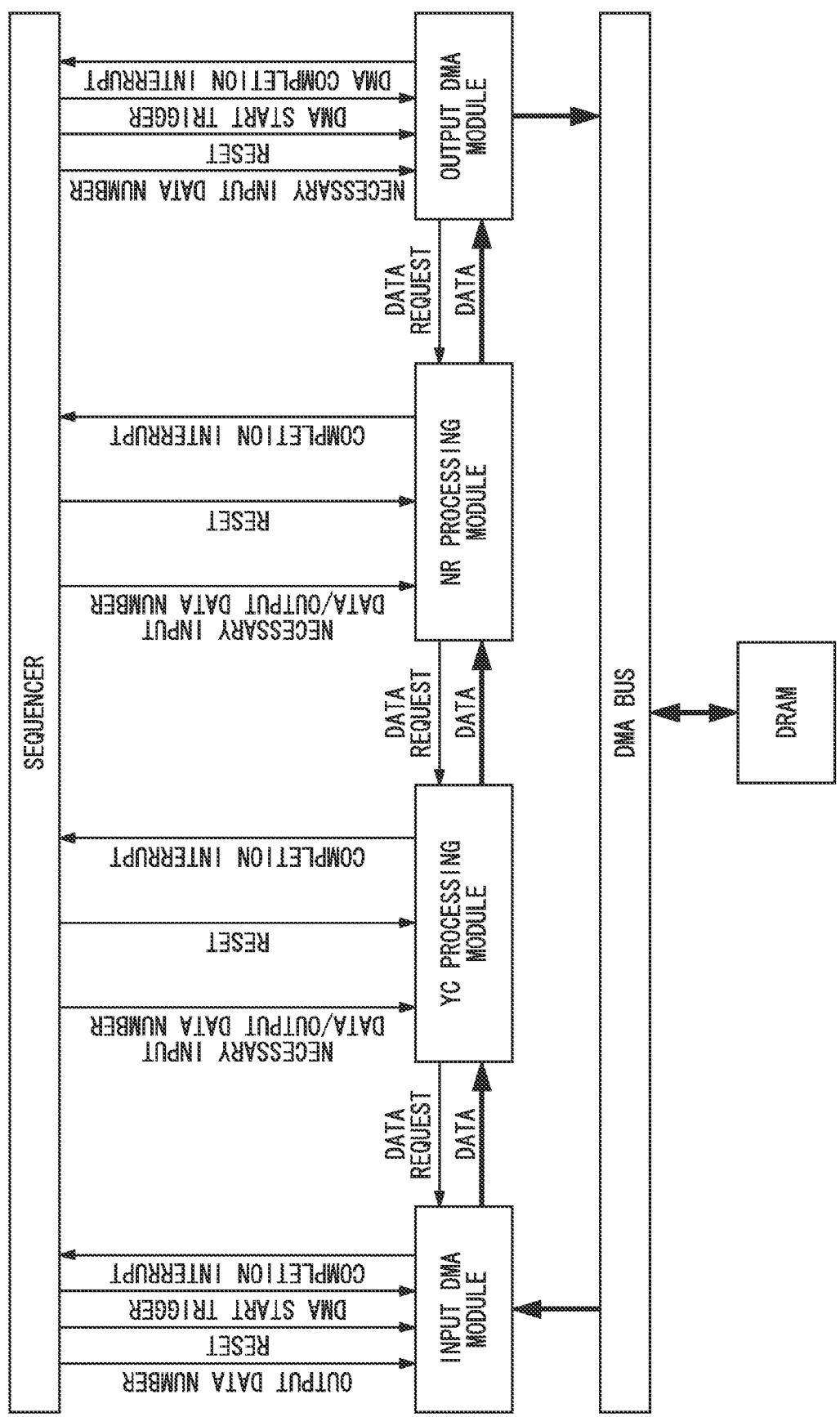
FIG. 15 is a block diagram illustrating a schematic configuration of an image processing apparatus that performs the pipeline process at a high speed in accordance with the related art.
Figure 16A:
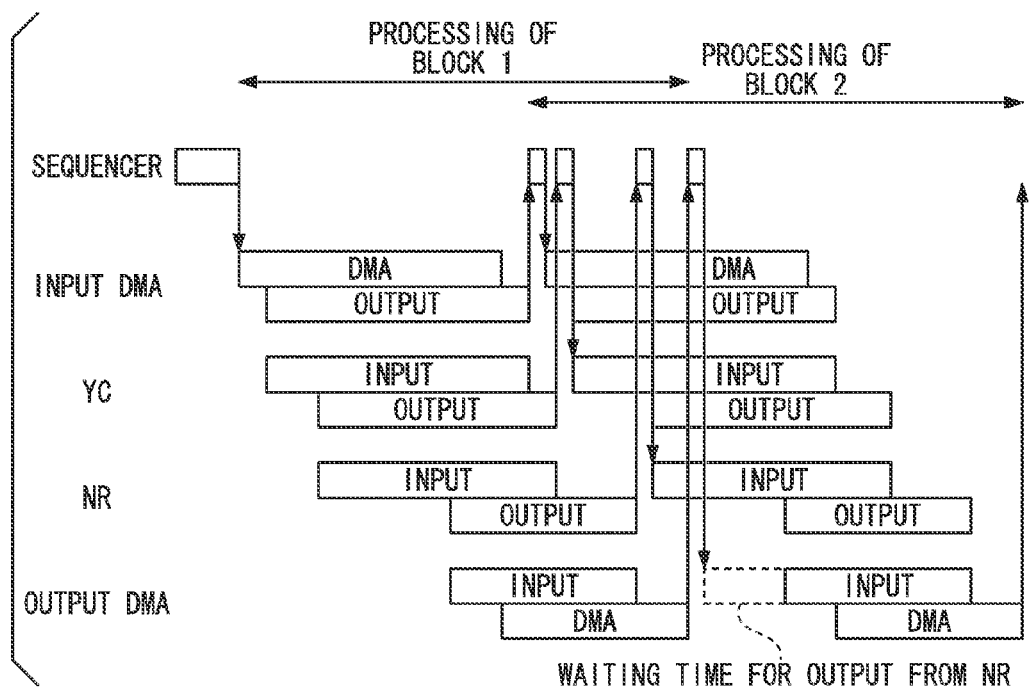
FIGS. 16A and 16B are diagrams illustrating an operation of the image processing apparatus that performs the pipeline process at the high speed in accordance with the related art.
Figure 16B:
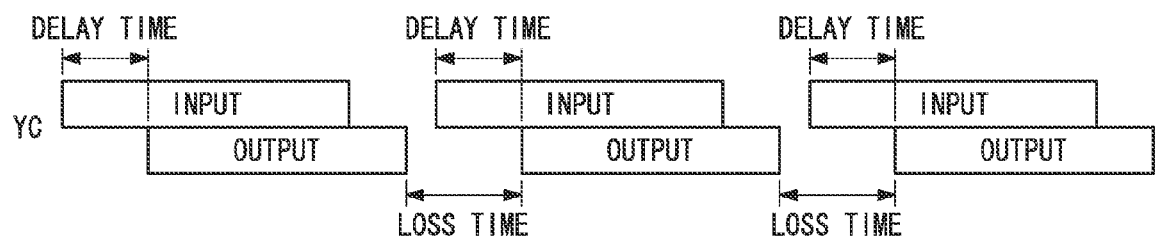

The DRAM 20 connected to the DMA bus 10 stores various data to be processed in the imaging apparatus. For example, data of a still image output from an imager (not shown) included in the imaging apparatus is stored. The image processing apparatus 1 of this embodiment performs image processing for each block by dividing data of a still image of one frame stored in the DRAM 20 into a plurality of overlapping blocks as shown in FIG. 14B. As shown in FIG. 1, the image processing in the image processing apparatus 1 of this embodiment is sequentially performed in the processing modules by a process of a pipeline in which the input DMA module 40, the image processing module-A 50, the image processing module-B 60, and the output DMA module 70 are connected in series. In the following description, data included in each block into which the data of the still image of the one frame is divided is referred to as "block image data."

When the pipeline process of the image processing apparatus 1 of this embodiment is performed, the sequencer 30 controls a processing sequence of each processing module constituting the pipeline. The sequencer 30 outputs a control signal, which controls settings and a processing start corresponding to a block for which the pipeline process is performed, to each processing module.

The input DMA module 40 is a processing module for reading block image data stored in the DRAM 20 and outputting the read block image data to the image processing module-A 50, which is the next processing module constituting the pipeline. The input DMA module 40 reads block image data from the DRAM 20 via the DMA bus 10 in response to the control signal input from the sequencer 30, and temporarily stores the read block image data. The input DMA module 40 outputs the temporarily stored block image data to the image processing module-A 50 in response to a data request signal input from the image processing module A-50. In FIG. 1, an output data number setting signal, a reset signal, and a DMA start trigger signal input from the sequencer 30 and a completion interrupt signal output to the sequencer 30 are shown.

The image processing module-A 50 is a processing module for outputting block image data (hereinafter referred to as "image-processed data") after image processing to the image processing module-B 60, which is the next processing module constituting the pipeline, by performing various digital image processing operations on the block image data input from the input DMA module 40. The image processing module-A 50 temporarily stores the block image data input from the input DMA module 40 in response to the control signal input from the sequencer 30. The image processing is performed for the temporarily stored block image data, and the image-processed data is output to the image processing module-B 60 in response to a data request signal input from the image processing module-B 60. The image processing module-A 50 is controlled by the sequencer 30 for each input operation and each output operation on the block image data. In FIG. 1, a common reset signal, an input data number setting signal, an input unit reset signal, an output data number setting signal, and an output unit reset signal input from the sequencer 30, and an input completion interrupt signal and an output completion interrupt signal output to the sequencer 30 are shown. The image processing module-A 50 will be described in detail later.

The image processing module-B 60 is a processing module for outputting block image data after image processing to the output DMA module 70, which is the next processing module constituting the pipeline by further performing various digital image processing operations on the image-processed data input from the image processing module A-50. Because only content of image processing to be performed for block image data is different between the image processing module-A 50 and the image processing module-B 60, its detailed description is omitted.

The output DMA module 70 is a processing module for writing (or storing) the block image data after the image processing input from the image processing module-B 60 to the DRAM 20. The output DMA module 70 temporarily stores the block image data after the image processing input from the image processing module-B 60 in response to the control signal input from the sequencer 30. The output DMA module 70 outputs the temporarily stored block image after the image processing to the DRAM 20 via the DMA bus 10. In FIG. 1, an input data number setting signal, a reset signal, and a DMA start trigger signal input from the sequencer 30 and a DMA completion interrupt signal output to the sequencer 30 are shown.

As described above, the processing modules within the image processing apparatus 1 perform a series of image processing operations on each block by sequentially performing image processing corresponding to the control signal output from the sequencer 30 for each block into which the data of the still image of the one frame is divided.

Figure 2:
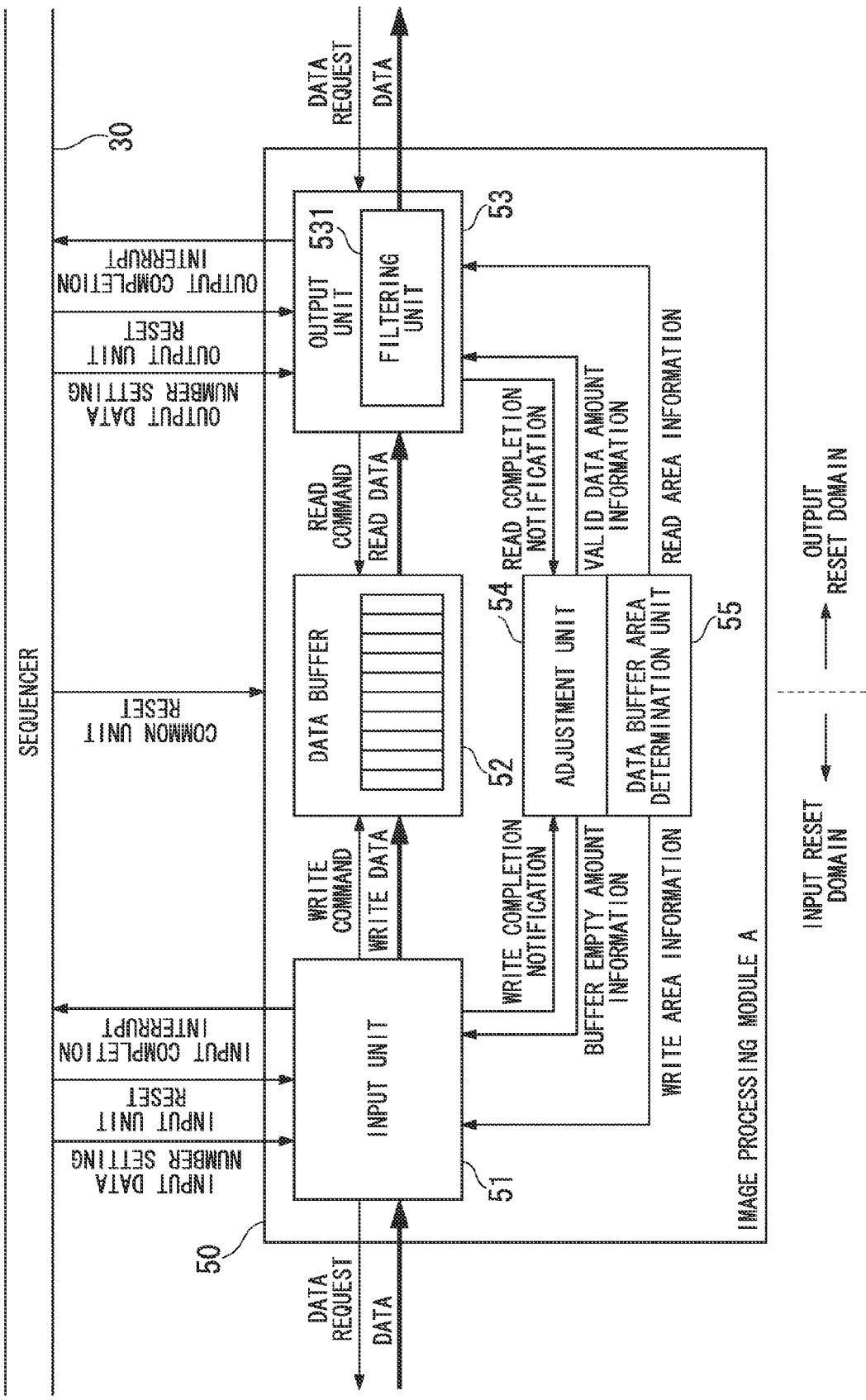
FIG. 2 is a block diagram illustrating a schematic configuration of an image processing module in the image processing apparatus in accordance with the first preferred embodiment of the present invention.

Next, the image processing modules within the image processing apparatus 1 will be described. As described above, because only content of image processing is different between the image processing module-A 50 and the image processing module-B 60, the image processing module-A 50 will be representatively described in the following description. The case where the image processing module-A 50 is a processing module that performs a filtering operation as image processing will be described. FIG. 2 is a block diagram illustrating a schematic configuration of the image processing module-A 50 included in the image processing apparatus 1 in accordance with the first preferred embodiment of the present invention. As shown in FIG. 2, the image processing module-A 50 includes an input unit 51, a data buffer 52, an output unit 53, an adjustment unit 54, and a data buffer area determination unit 55. The output unit 53 includes a filtering unit 531.

The data buffer 52 is a storage unit that temporarily stores block image data. The data buffer 52 is constituted, for example, by a static random access memory (SRAM) or the like.

The input unit 51 reads block image data corresponding to the number set by the input data number setting signal input from the sequencer 30 from a previous-stage processing module (the input DMA module 40 in this embodiment shown in FIG. 1), and writes the read block image data to the data buffer 52. The input unit 51 is initialized by the input unit reset signal input from the sequencer 30. When reading of a set number of block image data and writing of the read block image data to the data buffer 52 are completed, that is, when input processing is completed, the input unit 51 outputs the input completion interrupt signal to the sequencer 30. When the input unit 51 writes block image data to the data buffer 52, write data is written to a corresponding storage area of the data butler 52 by a write command generated based on buffer empty amount information input from the adjustment unit 54 and write area information input from the data buffer area determination unit 55. When the writing of the write data is completed, the input unit 51 outputs write completion notification to the adjustment unit 54.

The output unit 53 reads the block image data stored in the data buffer 52, and outputs image-processed data filtered by the filtering unit 531 included in the output unit 53 in response to a data request signal input from a subsequent-stage processing module (the image processing module-B 60 in this embodiment shown in FIG. 1). The number of image-processed data to be output by the output unit 53 is set by the output data number setting signal input from the sequencer 30. The output unit 53 is initialized by the output unit reset signal input from the sequencer 30. If reading of the block image data stored in the data buffer 52 and output of a set number of image-processed data are completed, that is, if output processing is completed, the output unit 53 outputs the output completion interrupt signal to the sequencer 30. The output unit 53 reads read data from a corresponding storage area of the data buffer 52 by a read command generated based on valid data amount information input from the adjustment unit 54 and read area information input from the data buffer area determination unit 55 when the stored block image data is read. The output unit 53 outputs read completion notification to the adjustment unit 54 when the reading of the read data is completed.

As filtering operations in the filtering unit 531, various image processing operations, such as a low-pass filtering operation, a noise reduction filtering operation, distortion correction processing, and an image resizing operation, are considered. Although an example in which the filtering unit 531 is included in the output unit 53 will be described in the following description, for example, the filtering unit can be configured in the input unit 51. If the filtering unit is configured in the input unit 51, data written by the input unit 51 to the data buffer 52 becomes image-processed data and the output unit 53 outputs the image-processed data stored in the data buffer 52.

The data buffer area determination unit 55 determines a storage area to be used among storage areas included in the data buffer 52. More specifically, the data buffer area determination unit 55 respectively determines a storage area to which the input unit 51 writes block image data and a storage area from which the output unit 53 reads the block image data. Information of the determined storage area to which the input unit 51 writes is output to the input unit 51 as write area information. Information of the storage area from which the output unit 53 reads is output to the output unit 53 as read area information.

The adjustment unit 54 manages the storage areas included in the data buffer 52. More specifically, the adjustment unit 54 outputs information of a storage area (hereinafter referred to as an "empty area") where no data is stored in the data buffer 52 to the input unit 51 as buffer empty amount information. When the input unit 51 writes block image data to the data buffer 52, the buffer empty amount information is used to determine whether or not a storage area of the data buffer 52 to which the block image data is to be written is an empty area. If the storage area of the data buffer 52 to which the block image data is to be written is an empty area, the input unit 51 determines that the data can be stored (or written) in the storage area, and executes the writing of the block image data.

The adjustment unit 54 outputs information of valid data stored in the data buffer 52 to the output unit 53 as valid data amount information. When the output unit 53 reads block image data from the data buffer 52, the valid data amount information is used to determine whether or not the valid data is stored in the storage area of the data buffer 52 from which the block image data is to be read. If the valid data is stored in the storage area of the data buffer 52 from which the block image data is to be read, the output unit 53 determines that the data can be acquired (or read) from the storage area, and executes the reading of the block image data.

The adjustment unit 54 updates the buffer empty amount information and the valid data amount information based on the write completion notification input from the input unit 51 and the read completion notification input from the output unit 53.

The adjustment unit 54 and the data buffer area determination unit 55 are initialized by the common reset signal input from the sequencer 30. That is, the adjustment unit 54 and the data buffer area determination unit 55 are not initialized by the input unit reset signal or the output unit reset signal. This is to avoid initialization of the buffer empty amount information or the valid data amount information that is information when processing is performed by the input unit reset signal or the output unit reset signal because the other may perform processing at a non-reset timing even when one of the input unit 51 and the output unit 53 is reset. When the initialization is performed by an input of the common reset signal from the sequencer 30, the buffer empty amount information is initialized to information indicating that the storage areas of the data buffer 52 are all empty areas, and the valid data amount information is initialized to information indicating that no valid data is stored in any of the storage areas of the data buffer 52.

In the image processing module-A 50 according to the above-described configuration, a control unit (hereinafter referred to as a "domain") to be reset is separated. More specifically, a reset domain (input reset domain) at the side of inputting the block image data and a reset domain (output reset domain) at the side of outputting the image-processed data are separated in a position of the data buffer 52.

As described above, the image processing module-A 50 respectively outputs the input completion interrupt signal indicating that input processing of the block image data is completed by the input unit 51 and the output completion interrupt signal indicating that output processing of the image-processed data is completed by the output unit 53 to the sequencer 30.

Thereby, in the image processing apparatus 1 of this embodiment, the sequencer 30 can reset a domain (control unit) corresponding to an interrupt signal and settings corresponding to a block for which the pipeline process is performed every time the interrupt signal (the input completion interrupt signal or the output completion interrupt signal) is input from the image processing module-A 50 or the image processing module-B 60 to the sequencer 30. Thereby, the image processing module-A 50 and the image processing module-B 60 can pre-start input processing of the next block image data output from a previous processing module while block image data output from the previous processing module is processed and output to the next processing module.

Figure 3A:
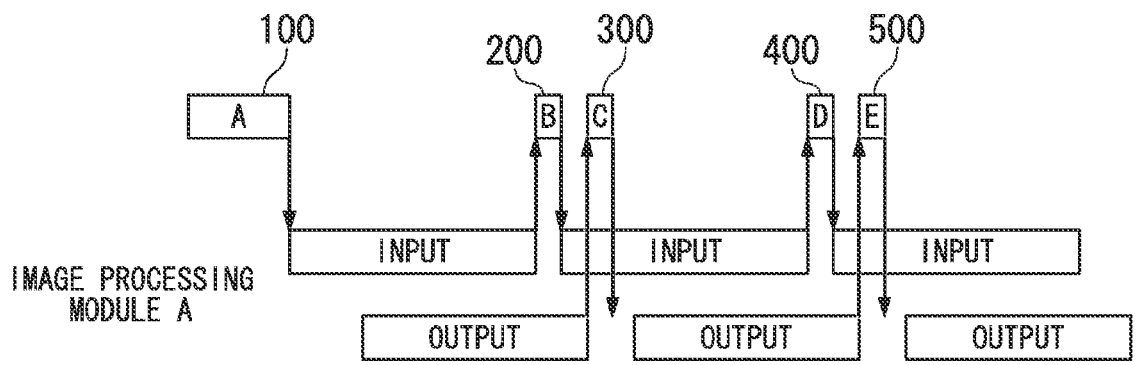
FIGS. 3A and 3B are diagrams illustrating examples of control timings and control content of the image processing module in the image processing apparatus in accordance with the first preferred embodiment of the present invention.
Figure 3B:
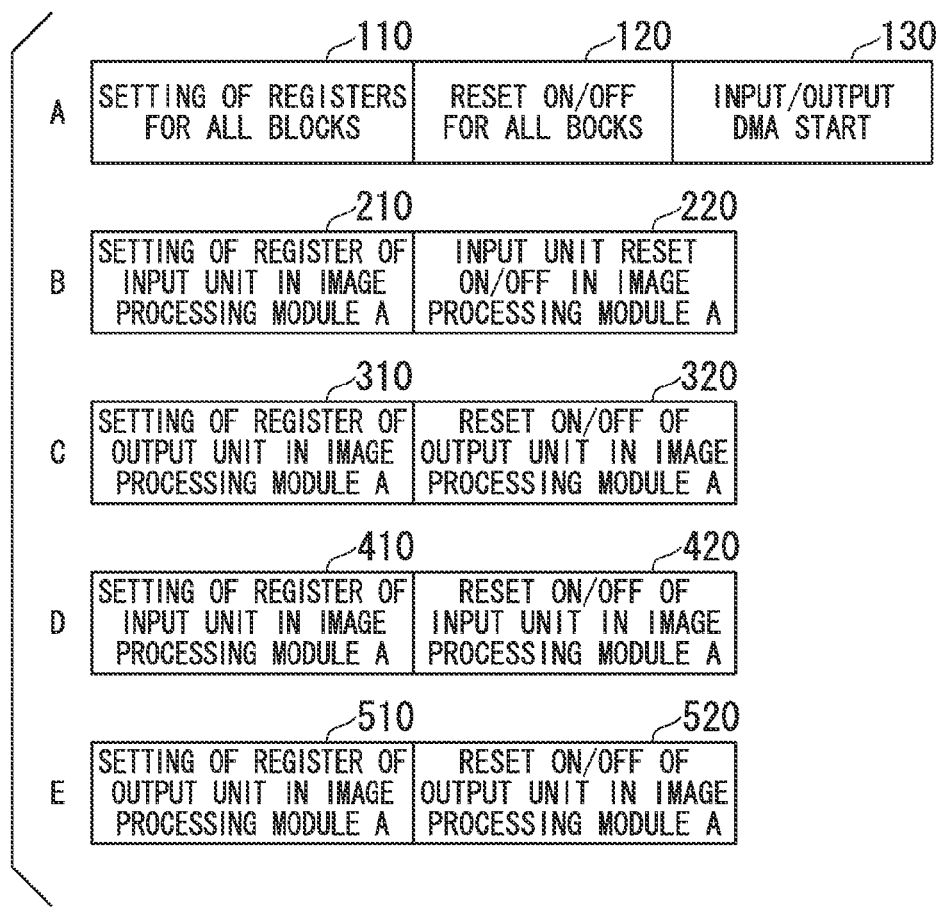

Here, control of the processing module in the image processing apparatus 1 shown in FIG. 1 will be described. In the following description, the pipeline process of the image processing apparatus 1 will be described focusing on the sequencer 30 and the image processing module-A 50. FIGS. 3A and 3B are diagrams illustrating examples of control timings and control content of the image processing module-A 50 in the image processing apparatus in accordance with the first preferred embodiment of the present invention. Timings of the pipeline process of the image processing apparatus 1 will be described with reference to FIG. 3A, and processing content of the sequencer 30 will be described with reference to FIG. 3B.

If the image processing apparatus 1 starts image processing of data of a still image of one frame stored in the DRAM 20, the sequencer 30 first performs processing 100. In the processing 100, the sequencer 30 first performs register settings such as necessary parameters or input/output data number when image processing of block image data is performed for all the processing modules (the input DMA module 40, the image processing module-A 50, the image processing module-B 60, and the output DMA module 70) constituting the pipeline in processing 110. For example, the number of output data, which is read from the DRAM 20 and output to the image processing module-A 50, is set in the input DMA module 40. The number of input data input from the input DMA module 40 is set in the input unit 51 of the image processing module-A 50, and necessary parameters when image processing of the block image data is performed or the output data number when the image-processed data is output to the next image processing module-B 60 is set in the output unit 53.

Subsequently, in processing 120, the sequencer 30 initializes (or resets) operation states of all the processing modules. In the reset of the processing modules, the sequencer 30 outputs the reset signal to the input DMA module 40 and the output DMA module 70, and outputs the common reset signal, the input unit reset signal, and the output unit reset signal to the image processing module-A 50 and the image processing module-B 60. Thereafter, the sequencer 30 releases the reset. Thereby, each processing module is in a state in which each processing can be started. At this time, the image processing module-A 50 outputs the data request signal to the input DMA module 40.

Subsequently, in processing 130, the sequencer 30 outputs the DMA start trigger signal to the input DMA module 40 and the output DMA module 70. Thereby, the input DMA module 40 reads image data of a first block (hereinafter referred to as "first block image data") from the DRAM 20 by DMA, and is in a state in which the first block image data can be output to the image processing module-A 50. Here, because the data request signal is input from the image processing module-A 50 to the input DMA module 40, the first block image data read by the input DMA module 40 from the DRAM 20 is output to the image processing module-A 50.

The input unit 51 within the image processing module-A 50 writes the input first block image data to the data buffer 52. The output unit 53 within the image processing module-A 50 reads the first block image data stored in the data buffer 52, and outputs image-processed data filtered by the filtering unit 531 in response to the data request signal input from the image processing module-B 60.

Thereafter, the image processing module-A 50 outputs the input completion interrupt signal to the sequencer 30 when the input unit 51 completes the writing of the first block image data to the data buffer 52, that is, when the first block image data corresponding to the input data number set by the sequencer 30 in the processing 110 is written to the data buffer 52.

If the input completion interrupt signal is input from the image processing module-A 50, the sequencer 30 performs processing 200. In the processing 200, the sequencer 30 first sets the input data number of image data of the next (second) block (hereinafter referred to as "second block image data") to be input from the input DMA module 40 for the input unit 51 of the image processing module-A 50 in processing 210.

Subsequently, in processing 220, the sequencer 30 resets an operation state at the side of the input unit 51 within the image processing module-A 50. In the reset at the side of the input unit 51, the sequencer 30 outputs only the input unit reset signal to the image processing module-A 50. Thereafter, the sequencer 30 releases the reset for the image processing module-A 50. Thereby, the image processing module-A 50 outputs a data request signal for requesting the second block image data to the input DMA module 40, and starts writing of the second block image data to the data buffer 52.

In processing 220, because the sequencer 30 does not output the common reset signal to the image processing module-A 50, the adjustment unit 54 and the data buffer area determination unit 55 within the image processing module-A 50 are not reset. Thus, when the input unit 51 within the image processing module-A 50 writes the second block image data to the data buffer 52, the writing of the second block image data is started from the next storage area after a storage area of the data buffer 52 to which the first block image data is finally written. Thereby, when the input unit 51 writes the second block image data to the data buffer 52, it is possible to avoid the first block image data, which is not output to the image processing module-B 60 after a filtering operation by the output unit 53, from being overwritten.

Thereafter, when reading of the first block image data from the data buffer 52 by the output unit 53 and output of the image-processed data to the image processing module-B 60 after the filtering operation by the filtering unit 531 end, that is, when image-processed data after the filtering operation according to the output data number set by the sequencer 30 in the processing 110 ends, the image processing module-A 50 outputs the output completion interrupt signal to the sequencer 30.

If the output completion interrupt signal is input from the image processing module-A 50, the sequencer 30 performs processing 300. In the processing 300, the sequencer 30 first sets necessary parameters when image processing of the second block image data is performed or the output data number when the image-processed data is output to the image processing module-B 60 for the output unit 53 of the image processing module-A 50 in processing 310.

Subsequently, in processing 320, the sequencer 30 resets an operation state at the side of the output unit 53 within the image processing module-A 50. In the reset at the side of the output unit 53, the sequencer 30 outputs only the output unit reset signal to the image processing module-A 50. Thereafter, the sequencer 30 releases the reset for the image processing module-A 50. Thereby, the image processing module-A 50 outputs image-processed data after filtering the second block image data stored in the data buffer 52 in response to the data request signal input from the image processing module-B 60.

In processing 320, because the sequencer 30 does not output the common reset signal to the image processing module-A 50, the adjustment unit 54 and the data buffer area determination unit 55 within the image processing module-A 50 are not reset. Thus, when the output unit 53 within the image processing module-A 50 reads the second block image data from the data buffer 52, the reading of the second block image data is started from the next storage area after a storage area of the data buffer 52 from which the first block image data is finally read. Thereby, when the output unit 53 reads the second block image data from the data buffer 52, it is possible to avoid the first block image data remaining in the data buffer 52 from being read, filtered, and output to the image processing module-B 60.

Thereafter, when writing of the second block image data to the data buffer 52 is completed by the input unit 51, that is, when the second block image data corresponding to the input data number set by the sequencer 30 in the processing 210 is written to the data buffer 52, the image processing module-A 50 outputs the input completion interrupt signal to the sequencer 30.

When the input completion interrupt signal is input from the image processing module-A 50, the sequencer 30 performs processing 400. In the processing 400, like the processing 200, the sequencer 30 performs processing corresponding to image data of the next (third) block (hereinafter referred to as "third block image data") input from the input DMA module 40. More specifically, in processing 410, the sequencer 30 sets the input data number of the third block image data for the input unit 51 of the image processing module-A 50. In processing 420, the sequencer 30 resets an operation state at the side of the input unit 51 within the image processing module-A 50 and releases the reset. Thereby, the image processing module-A 50 outputs a data request signal for requesting the third block image data to the input DMA module 40, and starts writing of the third block image data to the data buffer 52.

Thereafter, when reading of the second block image data from the data buffer 52 by the output unit 53 and output of the image-processed data to the image processing module-B 60 after the filtering operation by the filtering unit 531 end, that is, when the image-processed data after the filtering operation is output according to the output data number set by the sequencer 30 in processing 310, the image processing module-A 50 outputs the output completion interrupt signal to the sequencer 30.

When the output completion interrupt signal is input from the image processing module-A 50, the sequencer 30 performs processing 500. In the processing 500, like the processing 300, the sequencer 30 performs processing corresponding to the third block image data. More specifically, in processing 510, the sequencer 30 sets necessary parameters when image processing of the third block image data is performed or the output data number when the image-processed data is output to the image processing module-B 60 for the output unit 53 of the image processing module-A 50. In processing 520, the sequencer 30 resets an operation state at the side of the output unit 53 within the image processing module-A 50, and releases the reset. Thereby, the image processing module-A 50 outputs the image-processed data after filtering the third block image data stored in the data buffer 52 in response to the data request signal input from the image processing module-B 60.

Thereafter, likewise, every time the interrupt signal is input from the image processing module-A 50, the sequencer 30 iterates processing corresponding to the input interrupt signal until the pipeline process for data Of a still image of one frame is completed in the image processing apparatus 1.

As described above, the image processing module-A 50 included in the image processing apparatus 1 of this embodiment can respectively output the input completion interrupt signal when input processing of the block image data from the input DMA module 40 is completed and the output completion interrupt signal when output processing of the image-processed data after the filtering operation to the image processing module-B 60 is completed to the sequencer 30. The image processing module-B 60 included in the image processing apparatus 1 of this embodiment can respectively output the input completion interrupt signal when input processing of the image-processed data after the filtering operation from the image processing module-A 50 is completed and the output completion interrupt signal when output processing of the image-processed data to the output DMA module 70 is completed to the sequencer 30. Thereby, the image processing module-A 50 and the image processing module-B 60 can separate control (input reset domain) at the side of the input unit 51 and control (output reset domain) at the side of the output unit 53. Thereby, the image processing module-A 50 and the image processing module-B 60 can start input processing of the next block image data while executing output processing of previous image-processed data.

As described above, input processing of the next block image data is started before output processing of the image-processed data is completed, so that each of the image processing module-A 50 and the image processing module-B 60 can reduce a loss time from the completion of the output processing of the previous image-processed data to the start of the output processing of the next image-processed data and improve the efficiency of the pipeline process. In particular, it is possible to obtain a high effect in a processing module (for example, a distortion correction processing module described below) in which an input/output delay time from input of the block image data to output of the image-processed data after the filtering operation is long.

APPLICATION EXAMPLE

Figure 4A:
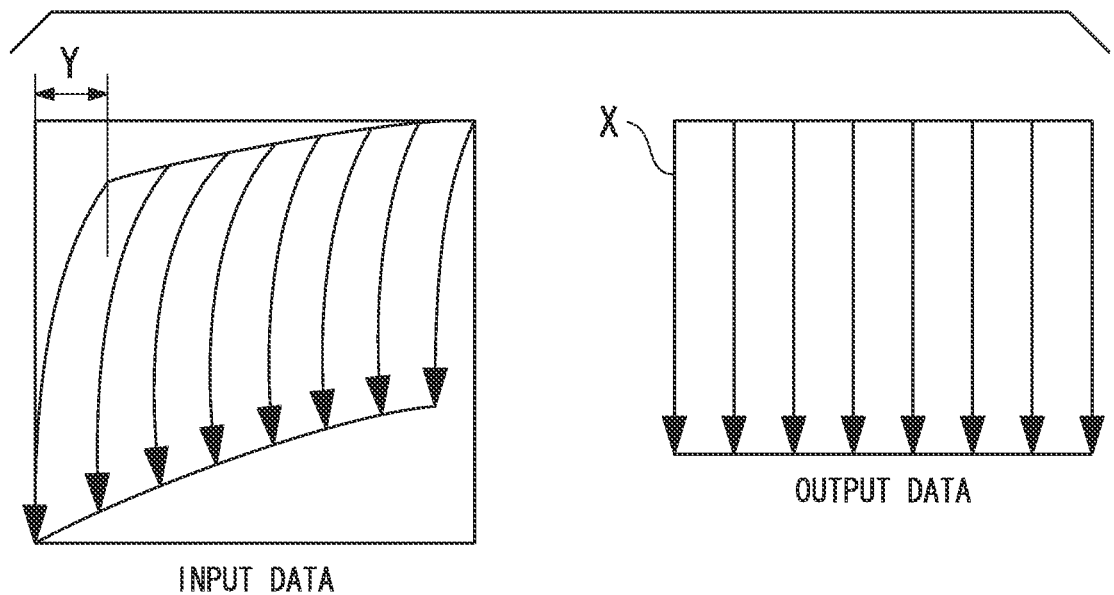
FIGS. 4A and 4B are diagrams illustrating a distortion correction processing to be performed in the image processing module in accordance with the first preferred embodiment of the present invention.
Figure 4B:
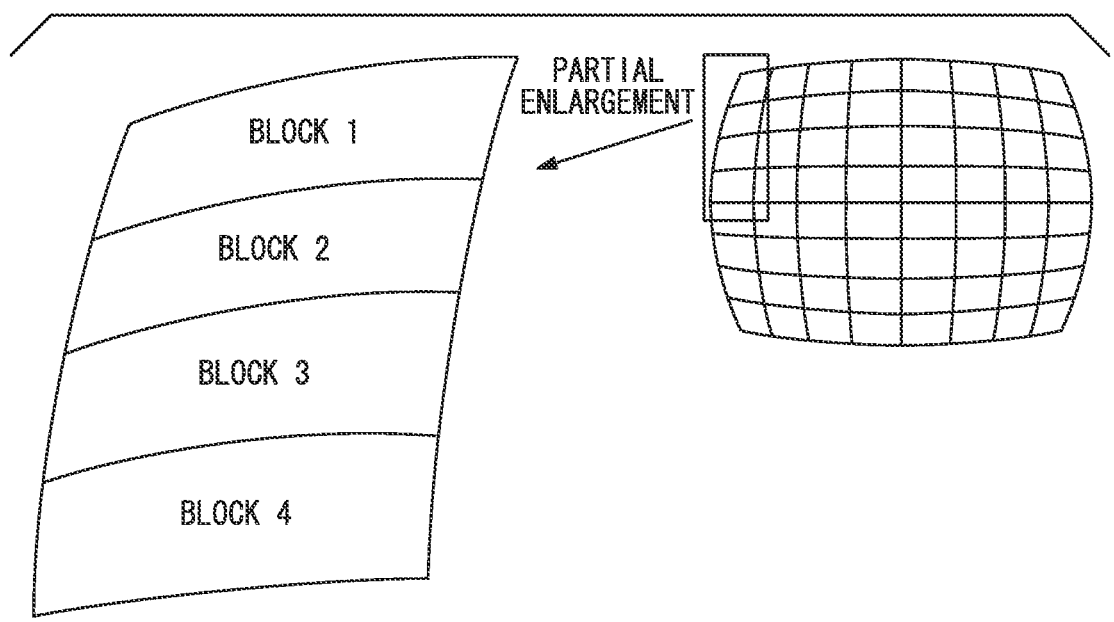

Next, an operation example in which the image processing module-A 50 is applied to actual image processing will be described. In the following description, an example in which the image processing module-A 50 performs distortion correction processing by the filtering unit 531 included in the output unit 53 will be described. FIGS. 4A and 4B are diagrams illustrating the distortion correction processing to be performed in the image processing module-A 50 in accordance with the first preferred embodiment of the present invention.

In general, in the distortion correction processing, an input/output delay time from input of input data before the distortion correction to output of output data after the distortion correction is long. This is because a plurality of input data are used in processing so as to obtain output data after one correction in the distortion correction processing. For example, as shown in FIG. 4A, input data for a range Y is necessary to obtain output data of one line X after the distortion correction. Thus, it is not possible to output the output data of the line X after the correction until the input data for the range Y is input to the processing module. Thereby, the loss time becomes long due to the distortion correction processing in the pipeline process.

In the distortion correction processing by the image processing module-A 50, data of a still image of one frame is divided into a plurality of blocks as shown in FIG. 4B. The distortion correction processing is performed for all block image data included in divided blocks. As described above, the image processing module-A 50 can perform input processing of the next block image data while executing output processing of image-processed data corresponding to previous block image data, that is, the distortion correction processing. More specifically, it is possible to start inputting block image data of a block 2 while performing the distortion correction processing for block image data of a first block 1. Thus, the image processing module-A 50 can shorten a delay time other than the input/output delay time in the distortion correction processing of the block 1 and reduce the loss time of the pipeline process.

Example of Distortion Correction Processing Method

Here, before describing an operation of the distortion correction processing by the image processing module-A 50, the distortion correction processing method and component configurations in the image processing module-A 50 will be described. First, the distortion correction processing method in the image processing module-A 50 will be described. FIGS. 5A, 5B, 5C, and 5D are diagrams illustrating examples of the distortion correction processing method in the image processing module-A 50 in accordance with the first preferred embodiment of the present invention. In this application example in which the image processing module-A 50 is applied to the distortion correction processing, the filtering unit 531 within the image processing module-A 50 performs the distortion correction processing for all block image data after data of a still image of one frame is divided into a plurality of blocks (hereinafter referred to as "block lines") in a horizontal direction as shown in FIG. 5A. The filtering unit 531 sequentially performs the distortion correction processing from the top (a block line 1) of the still image.

More specifically, the filtering unit 531 first performs the distortion correction processing of the block line 1 as shown in FIG. 5B. After the distortion correction processing of the block line 1 is completed, the distortion correction processing is performed in order like a block line 2 and a subsequent block line 3 as shown in FIGS. 5C and 5D.

A method of dividing the data of the still image when the filtering unit 531 performs the distortion correction processing is not limited to the division only in the horizontal direction shown in FIGS. 5A, 5B, 5C, and 5D. For example, as shown in FIG. 4A, a configuration can be made to perform a dividing operation in a vertical direction in addition to the horizontal direction and perform the distortion correction processing for each divided block.

Configuration Example of Data Buffer

Figure 6A:
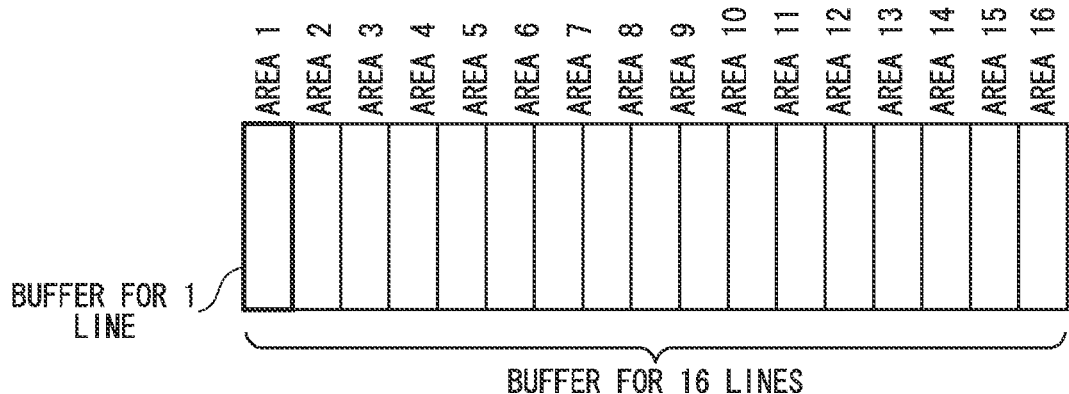
FIGS. 6A, 6B, and 6C are diagrams illustrating examples of configuration of a data buffer included in the image processing module in accordance with the first preferred embodiment of the present invention.

Next, the configuration of the data buffer 52 in this application example will be described. FIGS. 6A, 6B, 6C, and 7 are diagrams illustrating examples of configuration and operation of the data buffer 52 included in the image processing module-A 50 in accordance with the first preferred embodiment of the present invention. As shown in FIG. 6A, the data buffer 52 included in the image processing module-A 50 of this application example includes storage areas (areas 1 to 16) for 16 lines in the horizontal direction of a block line, where a width of the vertical direction of the block line is one line.

Figure 6B:
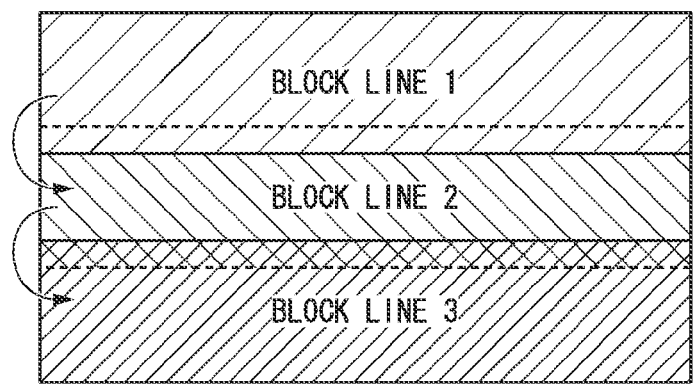
Figure 6C:
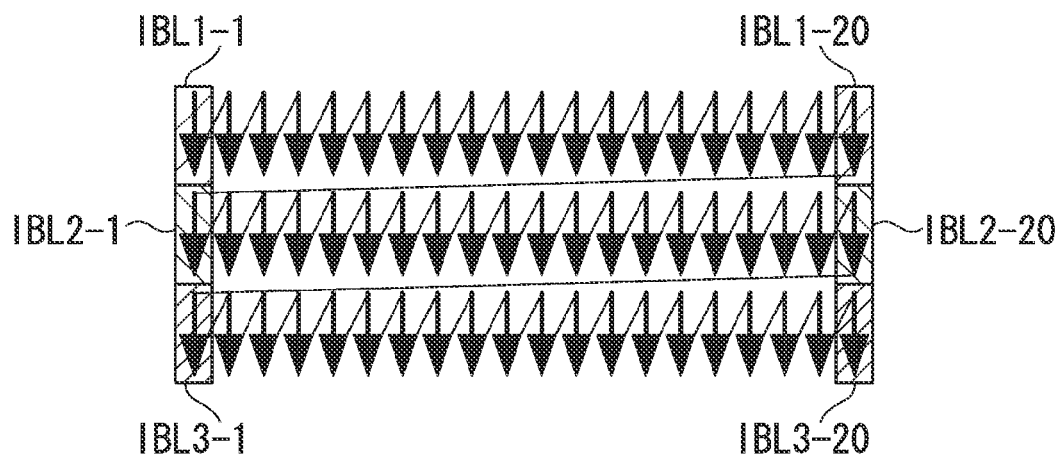

As described above, the distortion correction processing is performed in the order of Block Line 1→Block Line 2→Block Line 3 (see FIG. 6B). At this time, block image data is input from the input DMA module 40 to the image processing module-A 50 in the order shown in FIG. 6C. More specifically, block image data of a first line of the block line 1 is first input, and block image data of a second line of the block line 1 is subsequently input. Thereafter, if block image data of a 20th line of the block line 1 is input, block image data of a first line of the block line 2 is subsequently input. Thereafter, likewise, block image data is input from the input DMA module 40 in the order of block image data of a second line of the block line 2, . . . , block image data of a 20th line of the block line 2, block image data of a first line of the block line 3, . . . , block image data of a 20th line of the block line 3.

In the following description, block image data input to the image processing module-A 50 will be described by assigning reference numerals for distinguishing a block line and a line number within the block line. For example, the block image data of the first line of the block line 1 is referred to as "block image data IBL1-1." For example, the block image data of the 20th line of the block line 3 is referred to as "block image data IBL3-20." Likewise, image-processed data after the distortion correction processing output from the image processing module-A 50 after the distortion correction processing by the filtering unit 531 will also be described by assigning reference numerals for distinguishing a block line and a line number within the block line. For example, in the image-processed data after the distortion correction processing, image-processed data of the first line of the block line 1 is referred to as "image-processed data OBL1-1." For example, image-processed data of a $16^{th}$ line of the block line 3 is referred to as "image-processed data OBL3-16."

Figure 7:
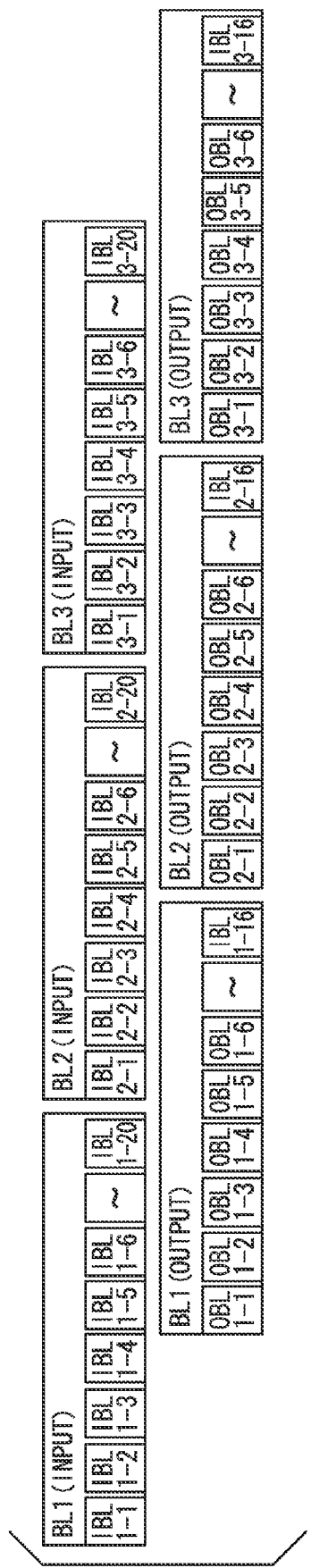
FIG. 7 is a view illustrating an operation example of the data buffer included in the image processing module in accordance with the first preferred embodiment of the present invention.

FIG. 7 shows timings of the pipeline process in which 20-line block image data is input from the input DMA module 40 to the image processing module-A 50 of this application example, and image-processed data after the distortion correction processing of 16 lines is output from the image processing module-A 50 of this application example to the image processing module-B 60.

Example of Data Writing to Data Buffer

Next, an operation of writing block image data to the data buffer 52 in this application example will be described. FIGS. 8A, 8B, 8C, and 8D are diagrams illustrating an operation example in which the block image data is written to the data buffer 52 included in the image processing module-A 50 in accordance with the first preferred embodiment of the present invention.

The configuration of the data buffer 52 included in the image processing module-A 50 of this application example includes storage areas for 16 lines as shown in FIG. 6A. That is, the storage areas of the data buffer 52 are only areas 1 to 16. Thus, in the image processing module-A 50, the data buffer 52 is configured in the form of a ring buffer in which the area 1 and the area 16 are virtually connected in a ring shape, and the input unit 51 controls writing of block image data input from the input DMA module 40. An area of the data buffer 52 to which block image data is written is determined by the data buffer area determination unit 55.

FIGS. 8A, 8B, 8C, and 8D show storage areas of the data buffer 52 where all block image data is stored when each block line is 20 lines in the case where block image data is written to the data buffer 52 in the order of Block Line 1→Block Line 2→Block Line 3. In FIGS. 8A, 8B, 8C, and 8D, states of the storage areas (areas 1 to 16) of the data buffer 52 are arranged and expressed four times in time series for easy description.

More specifically, if the pipeline process of the image processing apparatus 1 is started, the data buffer area determination unit 55 determines the areas 1 to 16 of the data buffer 52 as storage areas to which block image data IBL1-1 to IBL1-16 is written (see FIG. 8A). Every time the block image data IBL1-1 to IBL1-16 stored in the areas 1 to 16 is used in the distortion correction processing by the filtering unit 531 and they are determined to be empty areas by the adjustment unit 54, the data buffer area determination unit 55 determines the areas 1 to 16 of the data buffer 52 determined to be the empty areas as storage areas to which the next block image data is written in order (see FIGS. 8B to 8D).

FIG. 8B shows the case where the areas 1 to 4 of the data buffer 52 are determined to be storage areas to which block image data IBL1-17 to IBL1-20 is written and the areas 5 to 16 of the data buffer 52 are determined to be storage areas to which block image data IBL2-1 to IBL2-12 is written. When writing of the block image data IBL1-20 to the area 4 of the data buffer 52 is completed, the input unit 51 outputs the input completion interrupt signal to the sequencer 30.

FIG. 8C shows the case where the areas 1 to 8 of the data buffer 52 are determined to be storage areas to which block image data IBL2-13 to IBL2-20 is written and the areas 9 to 16 of the data buffer 52 are determined to be storage areas to which block image data IBL3-1 to IBL3-8 is written. When writing of the block image data IBL2-20 to the area 8 of the data buffer 52 is completed, the input unit 51 outputs the input completion interrupt signal to the sequencer 30.

FIG. 8D shows the case where the areas 1 to 12 of the data buffer 52 are determined to be storage areas to which block image data IBL3-9 to IBL3-20 is written. When writing of the block image data IBL3-20 to the area 12 of the data buffer 52 is completed, the input unit 51 outputs the input completion interrupt signal to the sequencer 30.

Example of Data Reading from Data Buffer

Next, an operation of reading block image data stored in the data buffer 52 in this application example will be described. FIGS. 9A, 9B, 9C, and 9D are diagrams illustrating an operation example in which block image data is read from the data buffer 52 included in the image processing module-A 50 in accordance with the first preferred embodiment of the present invention.

When the block image data stored in the data buffer 52 is read, the output unit 53 determines whether or not block image data necessary to perform distortion correction processing by the filtering unit 531 is stored within the data buffer 52, and performs reading from the data buffer 52 when determining that the necessary block image data is stored. The determination of whether or not the block image data necessary to perform the distortion correction processing is stored in the data buffer 52 is made based on the valid data amount information output from the adjustment unit 54.

FIGS. 9A, 9B, 9C, and 9D show the case where the distortion correction processing is performed using 20-line block image data stored in storage areas of the data buffer 52 and 16-line image-processed data is output. In FIGS. 9A, 9B, 9C, and 9D, reference numerals of block image data are shown only in areas of the data buffer 52 related to the distortion correction processing.

Here, an example of an operation of reading block image data stored in the data buffer 52 and generating image-processed data after the distortion correction processing will be described with reference to FIGS. 9A, 9B, 9C, and 9D.

Figure 9A:
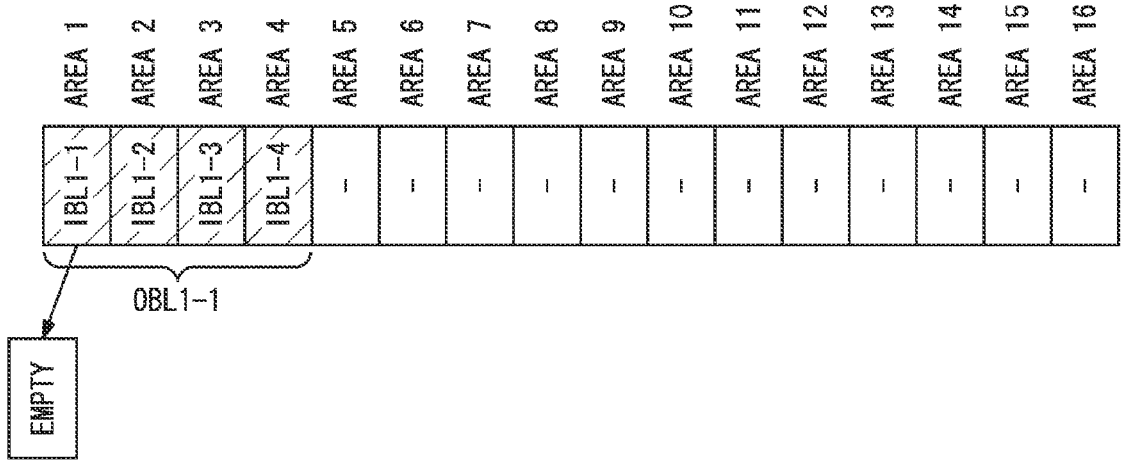
FIGS. 9A, 9B, 9C, and 9D are diagrams illustrating an operation example in which data is read from the data buffer included in the image processing module in accordance with the first preferred embodiment of the present invention.

First, the case where block image data IBL1-1 to IBL1-4 is necessary to output image-processed data OBL1-1 will be described with reference to FIG. 9A. The output unit 53 determines whether or not block image data stored in the areas 1 to 4 of the data buffer 52 is valid data based on the valid data amount information output from the adjustment unit 54. If the block image data stored in the areas 1 to 4 of the data buffer 52 is the valid data, the output unit 53 reads the block image data stored in the areas 1 to 4 of the data buffer 52, and outputs the image-processed data OBL1-1 after the distortion correction processing by the filtering unit 531.

The output unit 53 outputs read completion notification corresponding to a storage area unnecessary to output the next image-processed data OBL1-2 to the adjustment unit 54. The adjustment unit 54 designates the storage area of the data buffer 52 for which the read completion notification is input as an empty area. FIG. 9A shows the case where the read completion notification corresponding to the area 1 of the data buffer 52 storing the block image data IBL1-1, which is necessary to output the image-processed data OBL1-1 but unnecessary to output the image-processed data OBL1-2, is output, and the area 1 is designated as the empty area. The input unit 51 sequentially writes the next input block image data to the storage area of the data buffer 52 as the empty area.

Thereafter, the output unit 53 sequentially determines storage areas of the data buffer 52 necessary to output image-processed data OBL1-2 to OBL1-16 based on the valid data amount information output from the adjustment unit 54, and sequentially outputs the image-processed data OBL1-2 to OBL1-16 after the distortion correction processing by the filtering unit 531. After the image-processed data is output, the output unit 53 sequentially outputs the read completion notification corresponding to storage areas of the data buffer 52, which are unnecessary to output the next image-processed data, to the adjustment unit 54. Based on the input read completion notification, the adjustment unit 54 sequentially designates the storage areas of the data buffer 52 as the empty areas, and the input unit 51 sequentially writes the next input block image data to the storage areas of the data buffer 52 as the empty areas.

Figure 9B:
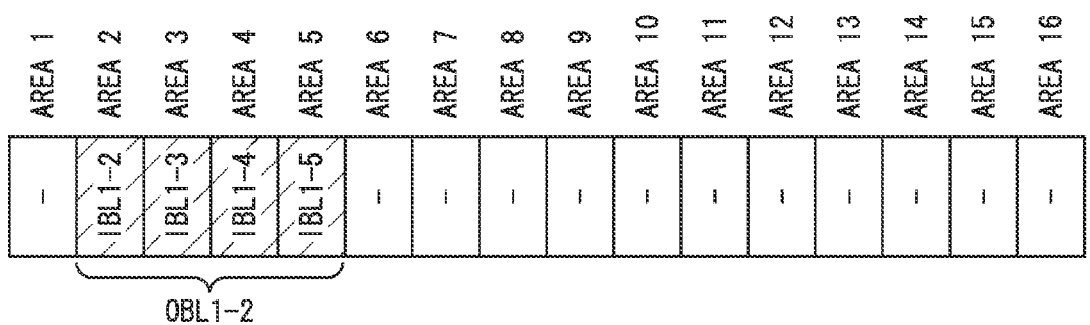

In FIG. 9B, the case where block image data IBL1-2 to IBL1-5 is necessary to output the image-processed data OBL1-2 is shown.

Figure 9C:
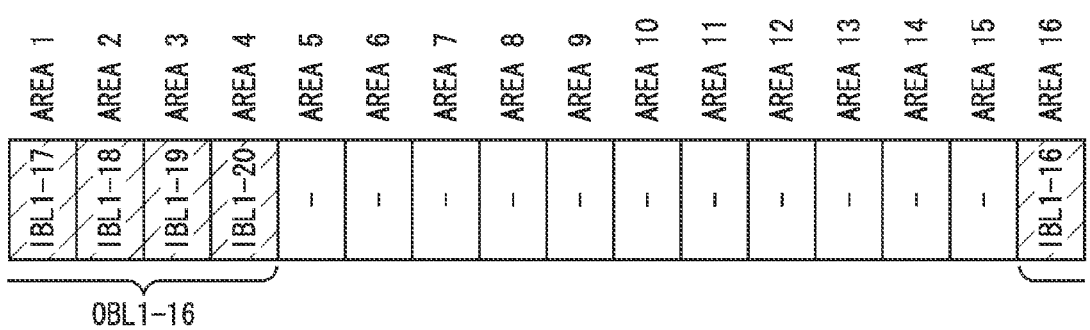
Figure 9D:
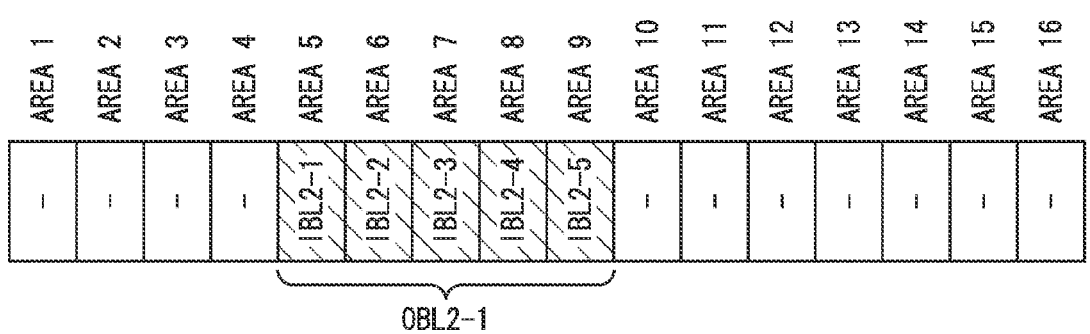

In FIG. 9C, the case where block image data IBL1-16 to IBL1-20 is necessary to output the image-processed data OBL1-16 is shown. In FIG. 9C, the output of the image-processed data OBL1-16 of the block line 1 is completed. Thereby, because the block image data IBL1-16 to IBL1-20 is unnecessary to output the image-processed data OBL2-1 corresponding to the next block line 2, the output unit 53 outputs the read completion notification corresponding to the areas 1 to 4 and the area 16 of the data buffer 52 to the adjustment unit 54. When the output of the image-processed data OBL1-16 to the next image processing module-B 60 is completed, the output unit 53 outputs the output completion interrupt signal to the sequencer 30.

Based on the valid data amount information output from the adjustment unit 54, the output unit 53 determines whether or not the block image data IBL2-1 to IBL2-5 necessary to output the image-processed data OBL2-1 is stored in the areas 5 to 9 of the data buffer 52. If the block image data stored in the areas 5 to 9 of the data buffer 52 is the valid data, the output unit 53 reads the block image data stored in the areas 5 to 9 of the data buffer 52 and outputs the image-processed data OBL2-1 after the distortion correction processing by the filtering unit 531 (see FIG. 9D).

Thereafter, the output unit 53 sequentially reads block image data and sequentially outputs image-processed data when the storage areas of the data buffer 52 necessary to output the image-processed data are sequentially determined based on the valid data amount information output from the adjustment unit 54 and the block image data stored in the storage areas of the data buffer 52 is valid data. After outputting the image-processed data, the output unit 53 sequentially outputs the read completion notification corresponding to the storage areas of the data buffer 52, which are unnecessary to output the next image-processed data, to the adjustment unit 54 to designate the storage areas of the data buffer 52 as the empty areas.

OPERATION EXAMPLE

Figure 10:
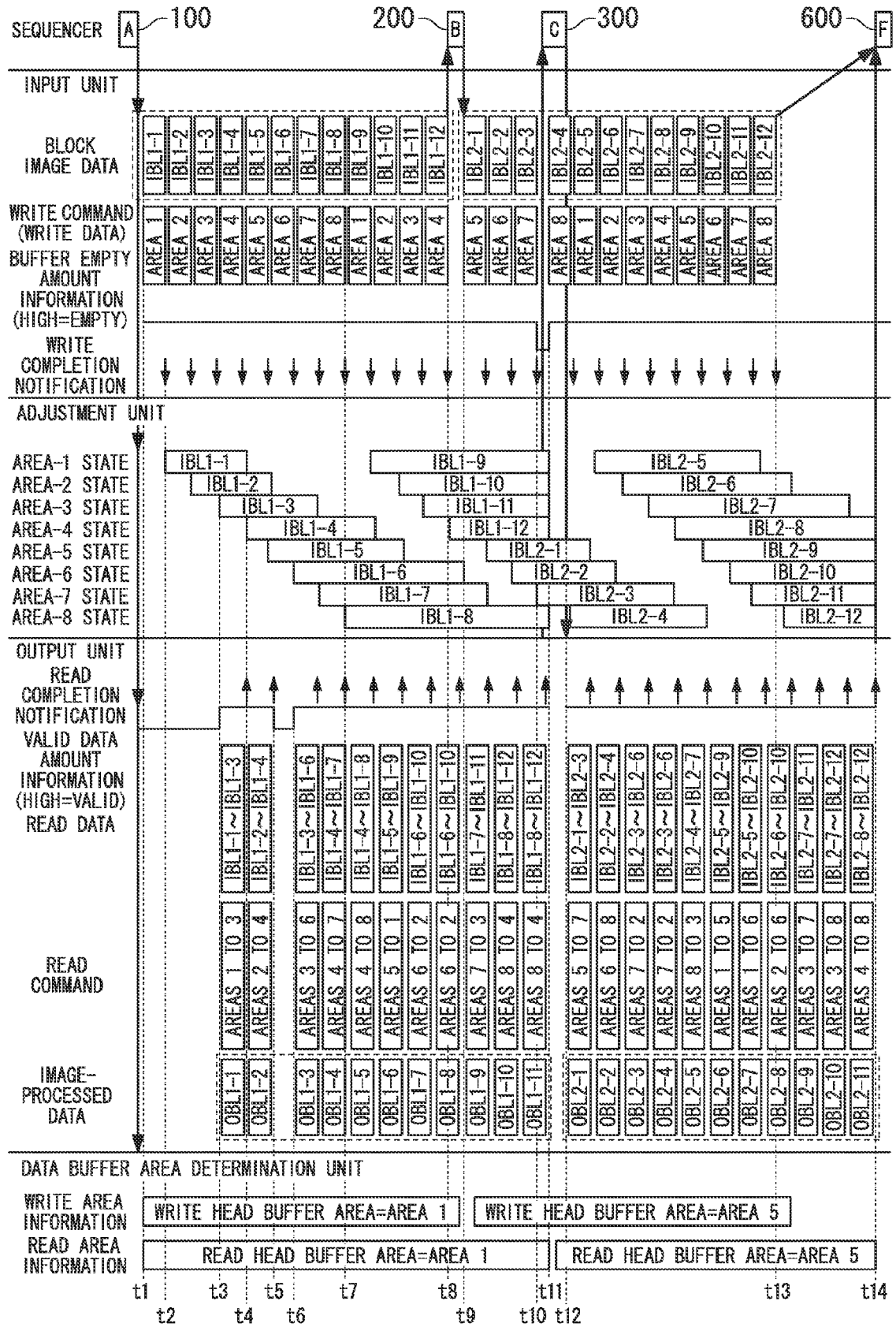
FIG. 10 is a diagram illustrating an example of timing of a pipeline process in the image processing module in accordance with the first preferred embodiment of the present invention.
Figure 11:
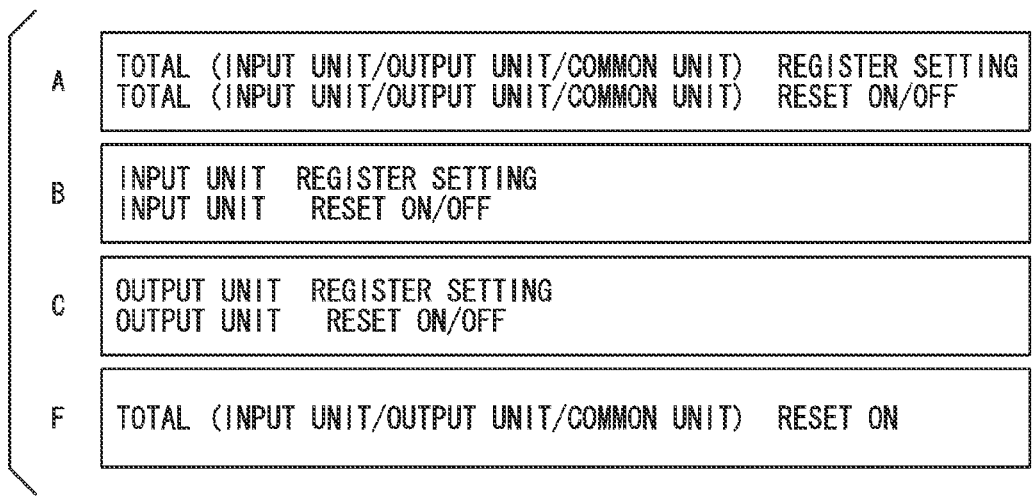
FIG. 11 is a diagram illustrating an example of a control content of the pipeline process in the image processing module in accordance with the first preferred embodiment of the present invention.

Next, an operation of distortion correction processing in the image processing module-A 50 of this application example will be described. FIGS. 10 and 11 are diagrams illustrating examples of timings and control content of the pipeline process in the image processing module-A 50 in accordance with the first preferred embodiment of the present invention. FIGS. 10 and 11 are examples in which the configuration of the image processing module-A 50 of this application example described using FIGS. 4A to 9D is simplified for easy description. Differing aspects in the description of FIGS. 10 and 11 are as follows. First, data of a still image of one frame is divided into two block lines. The data buffer 52 has storage areas (areas 1 to 8) for 8 lines. Twelve-line block image data is input to the input unit 51, and 11-line image-processed data is output from the output unit 53. The block image data and the image-processed data will be described by assigning reference numerals for distinguishing a block line and a line number within the block line as described above. The timings of the pipeline process of the image processing module-A 50 will be described with reference to FIG. 10, and the control content of the image processing module-A 50 by the sequencer 30 at the timings will be described with reference to FIG. 11.

If the image processing apparatus 1 starts image processing of the data of the still image of the one frame stored in the DRAM 20, the sequencer 30 first performs processing 100. In the processing 100, like the processing 100 described with reference to FIG. 3A, the sequencer 30 performs register settings such as parameters or input/output data number for all the processing modules constituting the pipeline, and initializes (or resets) operation states of all the processing modules. Thereby, the image processing module-A 50 is in a state in which the distortion correction processing can be started, and the buffer empty amount information output by the adjustment unit 54 is initialized to information indicating that storage areas of the data buffer 52 are all empty areas, and the valid data amount information is initialized to information indicating that no valid data is stored in any storage areas of the data buffer 52. A write head buffer area included in write area information output by the data buffer area determination unit 55 and a read head buffer area included in read area information become the area 1 of the data buffer 52. The input unit 51 outputs the data request signal for block image data to the input DMA module 40. In the following description, the adjustment unit 54 and the data buffer area determination unit 55 are also collectively referred to as a "common unit."

The sequencer 30 outputs the DMA start trigger signal to the input DMA module 40 and the output DMA module 70. Thereby, the input DMA module 40 reads the block image data IBL1-1 from the DRAM 20 by DMA, and outputs the read block image data IBL1-1 to the image processing module-A 50 (timing t1). If the block image data IBL1-1 is input from the input DMA module 40, the input unit 51 writes the input block image data IBL1-1 to the area 1 of the data buffer 52. If the writing of the input block image data IBL1-1 to the area 1 of the data buffer 52 is completed, the input unit 51 outputs the write completion notification to the adjustment unit 54. If the write completion notification is input from the input unit 51, the adjustment unit 54 changes a state of the area 1 to a state of "presence of data" (timing t2).

Thereafter, every time block image data is input from the input DMA module 40, the input unit 51 writes the input block image data to a corresponding storage area of the data buffer 52, and outputs the write completion notification to the adjustment unit 54. The adjustment unit 54 changes the state of an area corresponding to the data buffer 52 for which the write completion notification is input to the state of "presence of data."

Thereafter, when block image data necessary to generate image-processed data after the distortion correction processing is stored in the data buffer 52, the adjustment unit 54 changes the valid data amount information to a state indicating that the valid data is stored in the storage area within the data buffer 52. FIG. 10 shows the case where the block image data IBL1-1 to IBL1-3 is necessary to output the image-processed data OBL1-1, and the valid data amount information is changed when the block image data IBL1-3 is written to the area 3 of the data buffer 52. If the valid data amount information is input from the adjustment unit 54, the output unit 53 reads the block image data IBL1-1 to IBL1-3 from the areas 1 to 3 of the data buffer 52, and outputs the image-processed data OBL1-1 after performing the distortion correction processing by the filtering unit 531 (timing t3).

If the image-processed data OBL1-1 is output, the output unit 53 outputs the read completion notification corresponding to the area 1 of the data buffer 52 storing the block image data IBL1-1, which is unnecessary to output the next image-processed data OBL1-2, to the adjustment unit 54. If the read completion notification is input from the output unit 53, the adjustment unit 54 changes the state of the area 1 of the data buffer 52 storing the block image data IBL1-1 to a state of "absence of data," that is, a state of an empty area (timing t4).

Thereafter, the output unit 53 reads block image data from a corresponding storage area of the data buffer 52 based on the valid data amount information input from the adjustment unit 54, and outputs image-processed data for which the distortion correction processing is performed by the filtering unit 531.

Thereafter, in a period of timings t5 to t6 of FIG. 10, because the block image data IBL1-3 to IBL1-6 necessary to output the image-processed data OBL1-3 is not written to corresponding storage areas of the data buffer 52, the valid data amount information indicates that no valid data is stored and processing of the output unit 53 is in a waiting state. After the block image data IBL1-3 to IBL1-6 is written to the data buffer 52, the output unit 53 resumes reading of the block image data IBL1-3 to IBL1-6 from the data buffer 52, and outputs the image-processed data OBL1-3 for which the distortion correction processing is performed by the filtering unit 531.

The block image data IBL1-9 is input at a timing t7 of FIG. 10 after the block image data IBL1-8 to be written to the area 8 of the data buffer 52 is input from the input DMA module 40. At this time, because the state of the area 1 of the data buffer 52 is the state of "absence of data" in the adjustment unit 54, the input unit 51 continuously writes the block image data IBL1-9 to the area 1 of the data buffer 52.

If writing of the last block image data IBL1-12 of the block line 1 to the area 4 of the data buffer 52 is completed, the input unit 51 outputs the write completion notification to the adjustment unit 54, and outputs the input completion interrupt signal to the sequencer 30 (timing t8).

If the input completion interrupt signal is input from the image processing module-A 50, the sequencer 30 performs processing 200. In the processing 200, like the processing 200 described with reference to FIG. 3A, the sequencer 30 sets the input data number of block image data of the block line 2 to be input from the input DMA module 40 for the input unit 51 of the image processing module-A 50, and outputs the input unit reset signal for resetting the operation state at the side of the input unit 51 (timing t9). Thereby, the image processing module-A 50 is in a state in which input of the block image data of the block line 2 can be started, and the input unit 51 outputs the data request signal for the block image data of the block line 2 to the input DMA module 40. Because the common unit (the adjustment unit 54 and the data buffer area determination unit 55) is not reset, the input unit 51 sequentially writes the block image data of the block line 2 input from the input DMA module 40 from the area 5 of the data buffer 52. At this time, the write head buffer area included in the write area information output by the data buffer area determination unit 55 becomes the area 5 of the data buffer 52.

Thereafter, in a period of timings t10 to t11 of FIG. 10, because the block image data IBL1-8 stored in the area 8 of the data buffer 52 is used by the output unit 53 to output the image-processed data OBL1-11, that is, because reading of the block image data IBL1-8 by the output unit 53 is not completed, writing of the block image data IBL2-4 to the area 8 of the data buffer 52 by the input unit 51 is in a waiting state. If the output of the image-processed data OBL1-11 is completed, the output unit 53 outputs the read completion notification to the adjustment unit 54, and also outputs the output completion interrupt signal to the sequencer 30 (timing t11). After the reading of the block image data IBL1-8 by the output unit 53 is completed, the writing of the block image data IBL2-4 to the area 8 of the data buffer 52 is resumed by the input unit 51.

If the output completion interrupt signal is input from the image processing module-A 50, the sequencer 30 performs processing 300. In the processing 300, like the processing 300 described with reference to FIG. 3A, the sequencer 30 sets parameters necessary to perform the distortion correction processing of block image data of the block line 2 and the output data number of image-processed data for the output unit 53 of the image processing module-A 50, and outputs the output unit reset signal for resetting the operation state at the side of the output unit 53 (timing t12). Thereby, the image processing module-A 50 is in a state in which the distortion correction processing for the block image data of the block line 2 can be started, and the output unit 53 starts reading of the block image data of the block line 2 stored in the data buffer 52 and output of the image-processed data. Because the common unit (the adjustment unit 54 and the data buffer area determination unit 55) is not reset, the output unit 53 sequentially reads the block image data of the block line 2 from the area 5 of the data buffer 52. At this time, the read head butler area included in the read area information output by the data buffer area determination unit 55 becomes the area 5 of the data buffer 52.

Thereafter, if writing of the last block image data IBL2-12 of the block line 2 to the area 8 of the data buffer 52 is completed, the input unit 51 outputs the write completion notification to the adjustment unit 54, and also outputs the input completion interrupt signal to the sequencer 30 (timing t13). At the timing t13, the input completion interrupt signal is input to the sequencer 30, but the sequencer 30 does not perform any operation for the image processing module-A 50. This is because the input completion interrupt signal input at the timing t13 only indicates that block image data of all block lines is input to the image processing module-A 50, and it is not necessary to perform settings for the next block line in the image processing module-A 50.

Thereafter, if output of the image-processed data OBL2-11 is completed, the output unit 53 outputs the read completion notification to the adjustment unit 54, and also outputs the output completion interrupt signal to the sequencer 30 (timing t14).

If the output completion interrupt signal is input from the image processing module-A 50, the sequencer 30 performs processing 600. In the processing 600, the sequencer 30 resets the entire image processing module-A 50, and completes processing in the image processing module-A 50. More specifically, the sequencer completes the processing of the image processing module-A 50 by outputting the common reset signal, the input unit reset signal, and the output unit reset signal to the image processing module-A 50.

As described above, the image processing module-A 50 can respectively output the input completion interrupt signal when input processing of the block image data from the input DMA module 40 is completed and the output completion interrupt signal when output processing of the image-processed data subjected to the distortion correction processing is completed to the sequencer 30. According to a use state of the data buffer 52, it is possible to adjust an operation of controlling writing of the block image data to the data buffer 52 and an operation of controlling reading of the block image data from the data buffer 52.

Figure 12A:
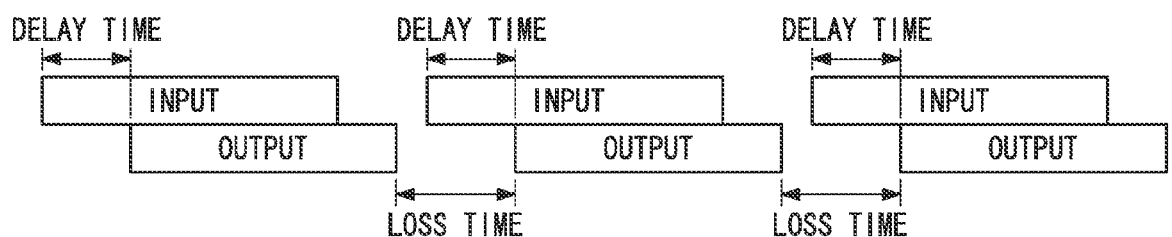
FIGS. 12A and 12B are diagrams for comparing a pipeline process in a processing module in accordance with the related art with a pipeline process in a processing module in accordance with the first preferred embodiment of the present invention.
Figure 12B:
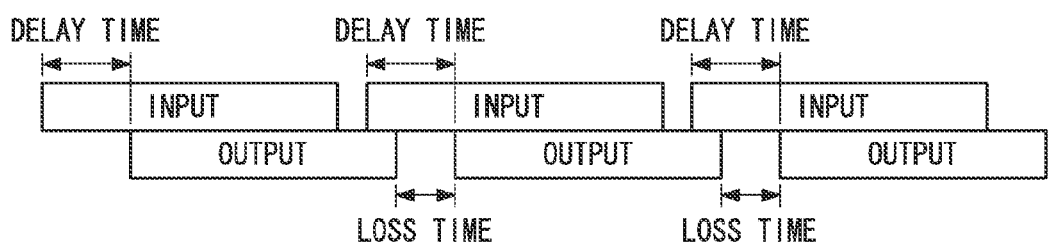

As described above, the image processing module-A 50 of this application example can start input processing of the next block image data while executing output processing of previous image-processed data. FIGS. 12A and 12B are diagrams for comparing a pipeline process in a processing module of the related art with a pipeline process in a processing module in accordance with the first preferred embodiment of the present invention. FIG. 12A shows the pipeline process in the processing module of the related art, and FIG. 12B shows the pipeline process in the processing module of this embodiment. In the processing module of the related art, a time from when an output corresponding to previously input data is completed to when an output corresponding to the next input data starts becomes a loss time as shown in FIG. 12A. On the other hand, in the image processing module-A 50 of this application example (the processing module of this embodiment), as shown in FIG. 12B, because an input/output delay time of the image processing module-A 50 does not change, but input processing of the next block image data can be started before output processing of the image-processed data is completed, a loss time from the completion of the output processing of the previous image-processed data to the start of the output processing of the next image-processed data can be further reduced than in the processing module of the related art. Thereby, in particular, it is possible to improve the efficiency of the pipeline process in the processing module in which the input/output delay time from input of the block image data to output of the image-processed data is long.

Example of Method of Determining Buffer Size of Data Buffer

The timings of the pipeline process shown in FIG. 10 include a period (of timings t5 to t6) in which processing of the output unit 53 waits and a period (of timings t10 to t11) in which writing of the block image data to the data buffer 52 by the input unit 51 waits. As described above, a waiting time in processing also affects the input/output delay time in the processing module and becomes the loss time in the pipeline process. It is possible to reduce the loss time due to the wait in the processing within the above-described processing module by optimizing a buffer size of the data buffer 52.

Figure 13:
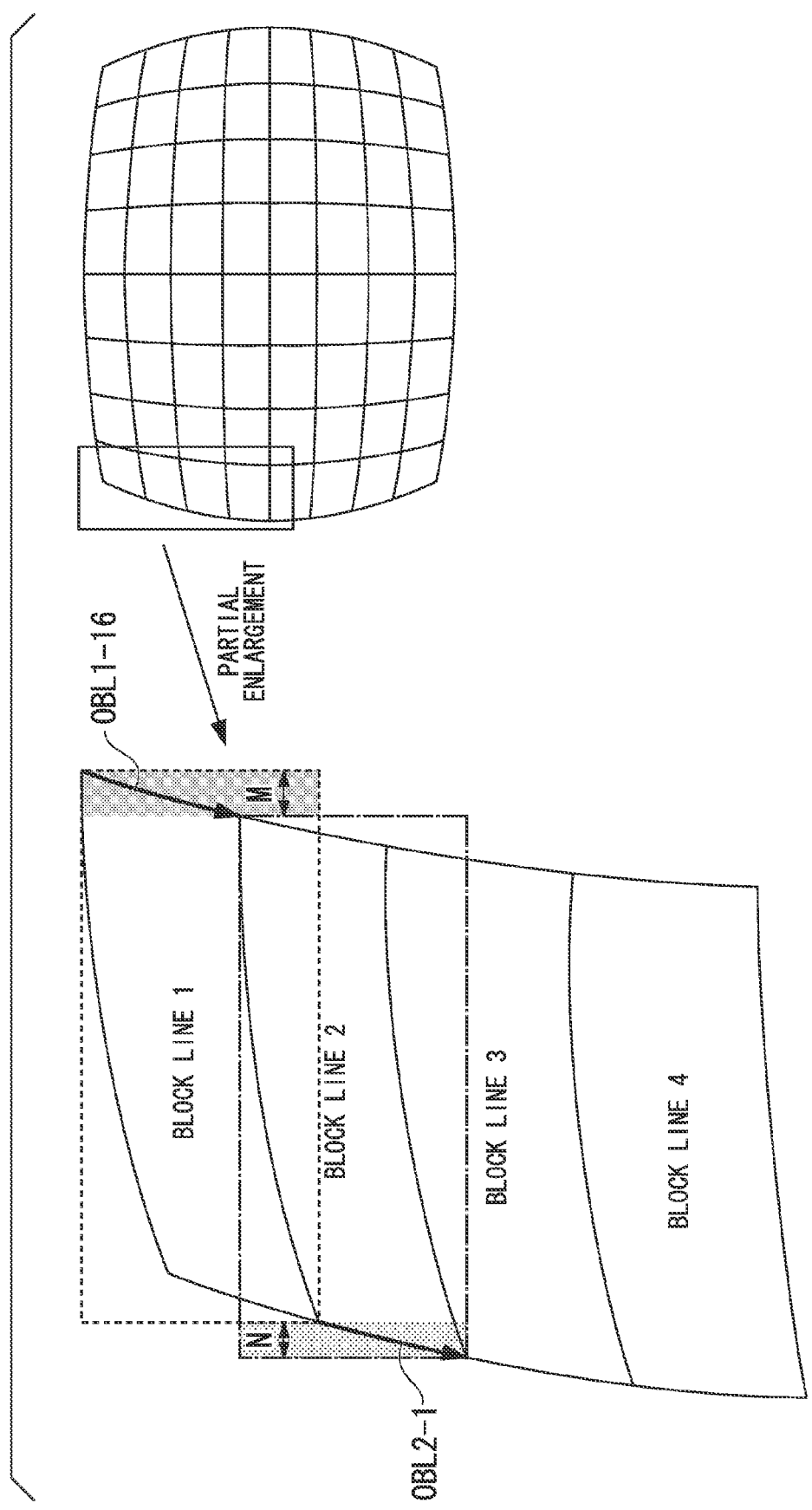
FIG. 13 is a diagram illustrating a method of determining the number of storage areas of the data buffer included in the image processing module in accordance with the first preferred embodiment of the present invention.

Here, a method of determining the buffer size of the data buffer 52 according to this application example will be described. FIG. 13 is a diagram illustrating a method of determining the number of storage areas (or the buffer size) of the data buffer 52 included in the image processing module-A 50 in accordance with the first preferred embodiment of the present invention. In the image processing module-A 50 of this application example, it is possible to make the determination based on the number of block image data necessary to output image-processed data of the last line of a block line having a largest distortion amount and the number of block image data necessary to output image-processed data of the first line of the next block line.

For example, it is assumed that the number of block image data necessary to output image-processed data of the last line of the block line 1 (for example, the image-processed data OBL1-16 shown in FIG. 9C) is a range (overlap width) M shown in FIG. 13, and the number of block image data necessary to output image-processed data of the first line of the block line 2 (for example, the image-processed data OBL2-1 shown in FIG. 9D) is a range (overlap width) N shown in FIG. 13. In this case, from the standpoint of the side of the output unit 53, it is possible to minimize a waiting time in processing within the image processing module-A 50, that is, a loss time, if the image-processed data OBL2-1 can be output immediately after the image-processed data OBL1-16 is output. That is, it is possible to minimize the loss time if the block image data necessary to output the image-processed data OBL2-1 is written to the data buffer 52 during the distortion correction processing of the image-processed data OBL1-16. This indicates that block image data of the range M used to output the image-processed data OBL1-16 and the block image data of the range N used to output the image-processed data OBL2-1 need to be stored in the data buffer 52 while the distortion correction processing of the image-processed data OBL1-16 is performed. Thus, a total value of the range M and the range N is determined to be the buffer size of the data buffer 52.

Thereby, it is possible to reduce the loss time in an optimum circuit scale by determining the buffer size of the data buffer 52 according to the number of block image data necessary for the filtering operation to be performed by the filtering unit 531. In this application example, a method of determining the buffer size based on the number of block image data necessary for the distortion correction processing has been described, but the method of determining the buffer size may differ according to a type of filtering operation to be performed by the filtering unit 531. For example, if the filtering operation by the filtering unit 531 is a low-pass filtering operation, the buffer size is determined based on the necessary number of data corresponding to the number of taps of a filter (or a filter size).

According to an embodiment of the present invention as described above, a reset control unit in a processing module having large time loss due to an input/output delay time within each processing module constituting the pipeline is separated at input and output sides of the processing module. Every time processing of the input or output side of the processing module is completed, a signal indicating that the processing is completed is configured to be output. More specifically, for example, the input side 51 and the output side 53 are separated in the image processing module-A 50, and the input completion interrupt signal and the output completion interrupt signal are respectively output. Thereby, when processing of one of the input side and the output side of the processing module is completed, it is possible to start the next processing and shorten a loss time due to the input/output delay time in the processing module even when processing of the other is not completed. Thereby, it is possible to reduce the loss time in the pipeline process.

The case where the present invention is applied to an image processing module that performs distortion correction processing has been described in this embodiment, but an applicable image processing module is not limited to the embodiment of the present invention. For example, the present invention can be applied to various image processing modules that perform a large filtering operation such as a low-pass filtering operation, a noise reduction filtering operation, or an image resizing operation.

Although an example in which the input DMA module 40, the image processing module-A 50, the image processing module-B 60, and the output DMA module 70 constitute the pipeline has been described in this embodiment, the processing modules constituting the pipeline are not limited to the embodiment of the present invention.

Figure 17A:
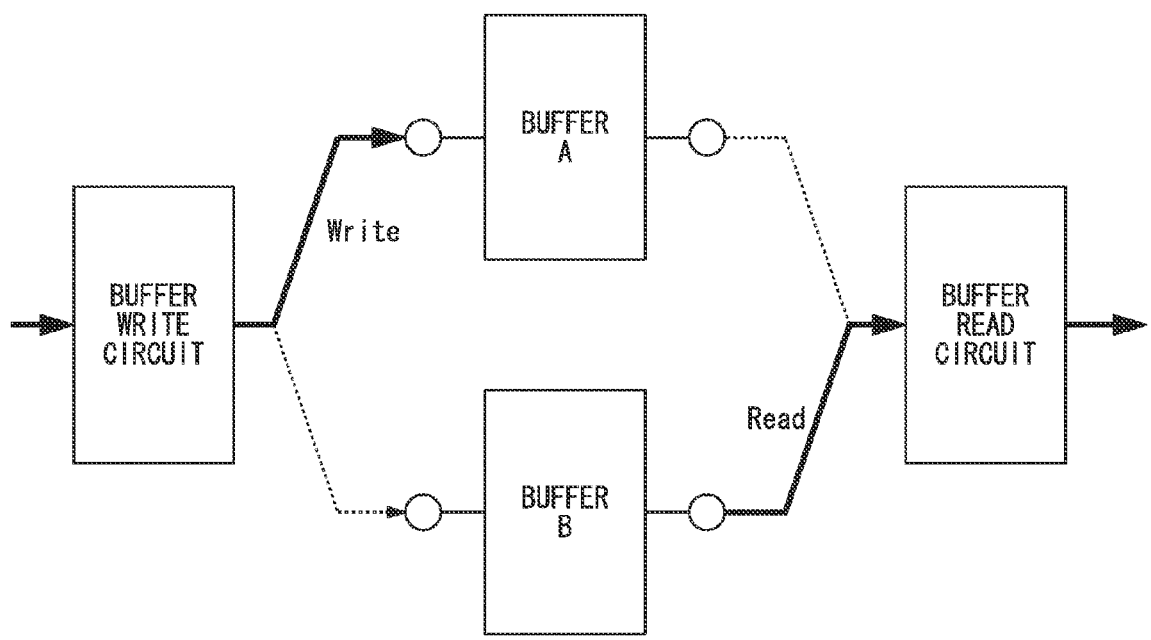
FIGS. 17A and 17B are diagrams illustrating configuration and operation examples of data buffers of an image processing module included in the image processing apparatus in accordance with the related art.
Figure 17B:
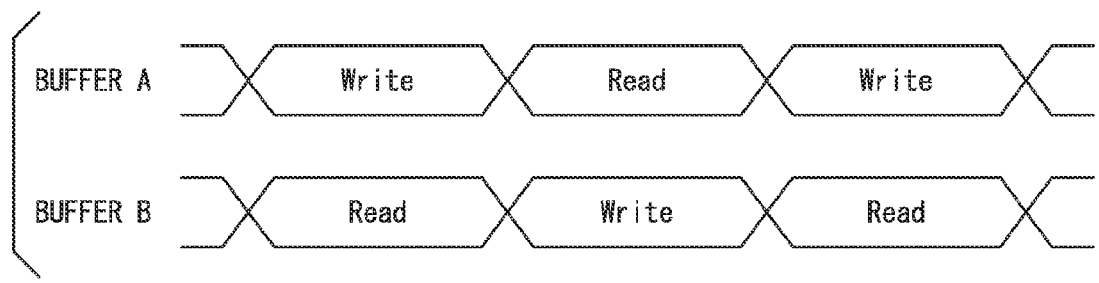

In Japanese Unexamined Patent Application, First Publication No. 2000-312327, a method using two buffers to shorten the loss time is disclosed (see FIG. 17A). FIGS. 17A and 17B are diagrams illustrating configuration and operation examples of data buffers of an image processing module included in the image processing apparatus in accordance with the related art. As shown in FIG. 17B, when the two buffers are used, if image data is written to one buffer (buffer A), switching is controlled so that image data written to the other buffer (buffer B) is read and output. However, because a large-capacity buffer may be used to perform a filtering operation in a processing module that performs the filtering operation, a circuit scale of the processing module becomes large if two large-capacity buffers are included in one processing module. In this embodiment, it is possible to perform the filtering operation using only one buffer by virtually connecting a buffer in a ring shape. Thus, it is possible to implement a processing module that performs the filtering operation in a smaller circuit scale than that of the processing module using the two buffers of the related art.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. An image data processing apparatus that divides image data of one frame into a plurality of block units and sequentially process the divided image data, comprising:
    a sequencer that controls an image processing sequence;
    a buffer unit that stores one or more of the block units of the image data;
    a data write control unit that writes one or more of the block units of the image data to the buffer unit;
    a data read control unit that reads one or more of the block units of the image data stored in the buffer unit, the data read control unit outputting one or more of the block units of the image data-generated based on the reading of one or more of the block units of the image data;
    a buffer area determination unit that determinates a storage area within the buffer unit to which the data write control unit writes one or more of the block units of the image data and a storage area within the buffer unit from which the data read control unit reads one or more of the block units of the image data,
    wherein the data write control unit writes one of the block units of the image data to the storage area determined by the buffer area determination unit, and outputs an image data write completion signal indicating that the writing of one of the block units of the image data is completed to the sequencer when the writing of one of the block units of the image data is completed,
    the data read control unit reads one of the block units of the image data from the storage area determined by the buffer area determination unit, and outputs an image data read completion signal indicating that the reading of one of the block units of the image data is completed to the sequencer when the output of one of the block units of the image data generated based on the reading of one of the block units of image data is completed, and
    the sequencer gives a write start command for allowing the data write control unit to start processing of the next block unit to the data write control unit in response to the image data write completion signal before receiving the image data read completion signal from the data read control unit.

2. The image data processing apparatus according to claim 1, wherein
the data write control unit writes the input image data to a writable area within the buffer unit determined by the buffer area determination unit, and determines that the writing of the image data is completed when writing of a preset number of the input image data to the buffer unit is completed,
the data read control unit reads the image data from a readable area within the buffer unit determined by the buffer area determination unit, completes reading of a preset number of the output image data from the buffer unit, and determines that the reading of the image data is completed when the output of the output image data generated based on the read image data is completed, and
the buffer area determination unit changes the writable area and the readable area within the buffer unit according to a write state of the input image data by the data write control unit and a read state of the image data by the data read control unit.

3. The image data processing apparatus according to claim 2, wherein
the buffer area determination unit determines the storage area within the buffer unit to which the image data is written by the data write control unit as the readable area in which valid image data is stored and from which the stored image data is readable, and
the buffer area determination unit determines the storage area within the buffer unit from which the image data is read by the data read control unit as the writable area having an empty area and to which the input image data is writable.

4. The image data processing apparatus according to claim 3, wherein
the data read control unit comprises a filtering unit that generates output image data filtered based on the read image data, and
a storage capacity of the storage area within the buffer unit is determined based on the necessary number of image data when the filtering unit performs a filtering operation.

5. The image data processing apparatus according to claim 4, wherein the storage capacity is a capacity capable of storing the input image data of which the number is twice the necessary number of image data when the filtering unit performs the filtering operation.

6. An image data processing apparatus that divides image data of one frame into a plurality of block units and sequentially processes the divided data, comprising:
a sequencer that controls an image processing sequence;
a buffer unit that stores one or more of the block units of the image data;
a data write control unit that writes one or more of the block units of the input image data to the buffer unit;
a data read control unit that reads one or more of the block units of the image data stored in the buffer unit, the data read control unit outputting output data generated based on the reading of one or more of the block units of the image data; and
a buffer area determination unit that determines a storage area within the buffer unit to which the data write control unit writes one or more of the block units of the image data and a storage area within the buffer unit from which the data read control unit reads one or more of the block units of the image data, and wherein
the data write control unit writes one of the block units of the image data to the storage area determined by the buffer area determination unit, and outputs an image data write completion signal indicating that the writing of one of the block units of the image data is completed to the sequencer when the writing of one of the block units of the input image data is completed,
the data read control unit reads one of the block units of the image data from the storage area determined by the buffer area determination unit, and outputs an image data read completion signal indicating that the reading of one of the block units of the image data is completed to the sequencer when the output of one of the block units of the image data generated based on the reading of one of the block units of image data is completed,
the data write control unit performs settings related to writing of one of the block units of the image data after the image data write completion signal is output,
the data read control unit performs settings related to reading of one of the block units of the image data after the image data read completion signal is output; and
an adjustment unit that sends buffer empty amount information to the data write control unit, and valid data amount information to the data read control unit,
the sequencer gives a write start command for allowing the data write control unit to start processing of the next block unit to the data write control unit in response to the image data write completion signal before receiving the image data read completion signal from the data read control unit.

* * * * *